(12) United States Patent
Peveler

(10) Patent No.: US 7,380,825 B2
(45) Date of Patent: Jun. 3, 2008

(54) LANDING GEAR AND METHOD OF ASSEMBLY

(75) Inventor: Michael W. Peveler, Warrenton, MO (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 11/412,688

(22) Filed: Apr. 27, 2006

(65) Prior Publication Data

US 2006/0186657 A1    Aug. 24, 2006

Related U.S. Application Data

(62) Division of application No. 10/405,079, filed on Apr. 1, 2003, now Pat. No. 7,055,859.

(51) Int. Cl.
*B60S 9/18* (2006.01)
(52) U.S. Cl. ............... 280/766.1; 280/763.1; 280/765.1; 254/419; 254/425
(58) Field of Classification Search ............ 280/763.1, 280/764.1, 765.1, 766.1; 254/418, 419, 425, 254/427
See application file for complete search history.

(56) References Cited

U.S. PATENT DOCUMENTS

| | | | |
|---|---|---|---|
| 3,632,086 A | 1/1972 | Mai | |
| 3,675,497 A | 7/1972 | Thomas | |
| 3,861,648 A | 1/1975 | Glassmeyer | |
| 3,892,141 A | 7/1975 | Phillips, Jr. et al. | |
| 4,187,733 A | 2/1980 | Walther et al. | |
| 4,205,824 A | 6/1980 | Mai | |
| 4,466,637 A | 8/1984 | Nelson | |
| 5,199,738 A | 4/1993 | VanDenberg | |
| 5,238,266 A | 8/1993 | VanDenberg | |
| 5,426,961 A | 6/1995 | Rimbaud et al. | |
| 5,538,225 A | 7/1996 | VanDenberg | |
| 5,542,647 A | 8/1996 | Huetsch | |
| 5,676,018 A | 10/1997 | VanDenberg | |
| 5,911,437 A | 6/1999 | Lawrence | |
| 6,141,997 A | 11/2000 | Blehi, III | |
| 6,598,886 B2 | 7/2003 | Baird et al. | |
| 6,684,726 B2 | 2/2004 | Schmidt et al. | |

(Continued)

FOREIGN PATENT DOCUMENTS

EP    0 398 705    11/1990

*Primary Examiner*—Jeffrey J Restifo
(74) *Attorney, Agent, or Firm*—Price, Heneveld, Cooper, DeWitt & Litton, LLP

(57) ABSTRACT

Landing gear for selectively supporting a semitrailer and a method of assembly of the landing gear is provided. The landing gear includes a leg having an upper section and a lower section telescopingly received in the upper section. A lead screw extends and retracts the upper and lower sections relative to each other upon rotation thereof. An input shaft applies a torque to the lead screw to drive rotation thereof, the input shaft being rotatable about a rotation axis and movable in translation along the rotation axis for shifting between a first position for low gear operation and a second position for high gear operation. An output shaft, axially aligned with the input shaft, has an output gear for transmitting torque to the lead screw. A gearing subassembly is received in the upper leg section and is configured to augment lift when the input shaft is in the first position and augment speed in the second position.

33 Claims, 27 Drawing Sheets

U.S. PATENT DOCUMENTS

| | | | |
|---|---|---|---|
| 6,846,016 B2 * | 1/2005 | VanDenberg et al. | 280/763.1 |
| 7,055,859 B2 * | 6/2006 | Peveler | 280/766.1 |
| 2003/0006599 A1 | 1/2003 | VanDenberg et al. | |
| 2003/0168648 A1 | 9/2003 | Gallego et al. | |
| 2005/0285380 A1 * | 12/2005 | Stanczak | 280/763.1 |
| 2006/0061078 A1 * | 3/2006 | Baxter | 280/763.1 |

* cited by examiner

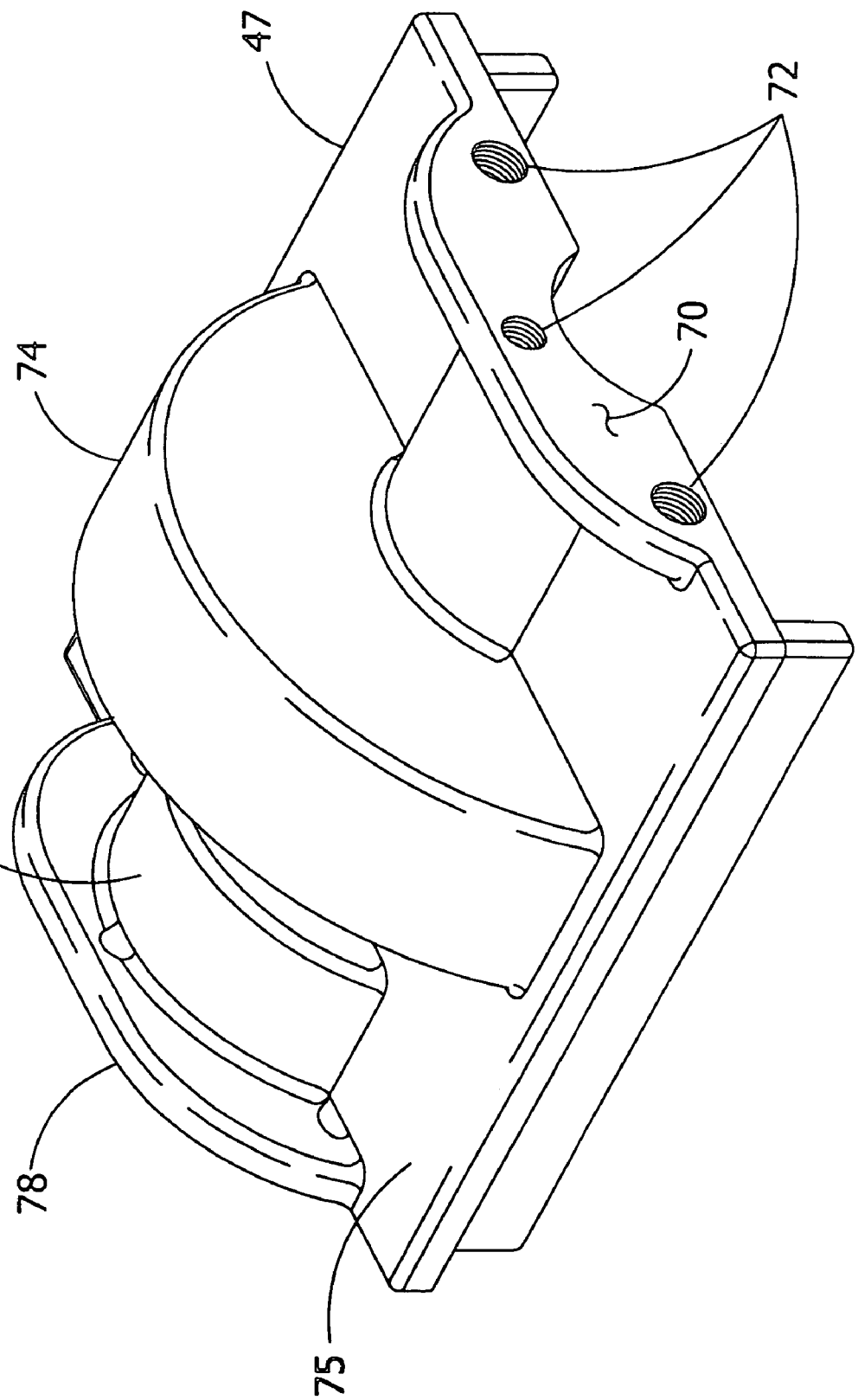

LANDING GEAR AND METHOD OF ASSEMBLY

CROSS REFERENCE TO RELATED APPLICATION

This application is a divisional of U.S. patent application Ser. No. 10/405,079, filed on Apr. 1, 2003, now U.S. Pat. No. 7,055,859, titled LANDING GEAR AND METHOD OF ASSEMBLY.

BACKGROUND OF THE INVENTION

This invention relates generally to landing gear used in the support of semitrailers and more particularly to gearing configurations of a landing gear.

Landing gear of the present invention has particular application in the support of semitrailers when they are not attached to a tractor. The landing gear conventionally includes a pair of telescoping legs capable of extending to engage the pavement or other supporting surface to hold up the front end of the semitrailer, and of retracting to move up out of the way when the semitrailer is being pulled over the road by a tractor. The extension and retraction is most often carried out by the driver manually turning a crank connected by gearing to a lead screw in the leg. The lead screw interconnects telescoping leg sections of the leg so as to retract a lower leg section into an upper leg section or extend the lower leg section from the upper leg section depending on the direction the screw is rotated.

The semitrailers are very large and heavy by themselves, and further carry large loads. In order to lift such loads when extending the legs, the gearing provides a mechanical advantage in addition to the crank. In providing the mechanical advantage, the rotation of the lead screw is very much retarded in relation to the rotation of the crank. In other words, it will require numerous turns of the crank to achieve a very small linear travel of the lower leg section relative to the upper leg section. The high ratio of turns per inch of travel is acceptable when the legs are actually bearing the load of the trailer because of the accompanying mechanical advantage. Once the load is relieved from the leg, such as when the semitrailer is supported by the tractor, the slow linear movement of the lower leg section becomes an issue because of the long time it takes to get the lower leg section retracted far enough above the ground for safe travel over the road. Likewise, slow extension of the lower leg section into engagement with the pavement is also highly undesirable. It is known to provide for shifting between a low gear and a high gear in the gearing, with the low gear providing the mechanical advantage needed for lifting large loads and high gear providing for more rapid linear movement of the lower leg section (i.e., a lower turns per inch ratio). Co-assigned U.S. Pat. No. 4,187,733 discloses gearing of this type. Generally, a large difference between the turns per inch ratio in low gear versus high gear is desirable.

One way to assist in providing greater lift in low gear is to provide a gear on an idler shaft located between the input shaft (of the crank) and the output shaft connected to the lead screw. This arrangement is typically referred to as a double reduction. An idler shaft requires additional space in the gear box, which is at a premium. In addition, there are two additional openings in the gear box containing bearings for the idler shaft. These openings provide an additional place from which leakage of lubricant becomes more likely over the life of the landing gear.

Conventionally, the gearing has been located in a gear box which is formed separately from the leg. For instance, the gear box may be formed from two halves which are individually stamped and later bolted together. The gears making up the gearing may be installed in one half of the gear box before it is completed. The gear box is welded or otherwise attached to the landing gear leg on the inside or outside of the leg. The input shaft from the crank, and the output shaft which is connected to the lead screw, are held by bearings located in the landing gear leg. The conventional construction requires a number of parts in addition to the landing gear leg and several manufacturing steps to assemble the gearing in the gear box with the input and output shafts and the leg. It is known to incorporate some of the gearing in the leg, but significant manufacturing steps are required to assemble component parts of the gearing together with the input and output shafts.

SUMMARY OF THE INVENTION

Among the several objects and features of the present invention may be noted the provision of landing gear which is of simplified construction; the provision of such landing gear having a compact gear arrangement; the provision of such landing gear which provides additional torque in low gear and augmentation of crank rotation in high gear to increase speed; the provision of such a landing gear which inhibits leakage of lubricant; the provision of such landing gear which has fewer external bearings receiving shafts; the provision of such landing gear which has fewer parts; the provision of such landing gear which is lighter in weight; and the provision of such landing gear which can be efficiently assembled.

Further among the several objects and features of the present invention may be noted the provision of a method of assembling landing gear which can be carried out rapidly and with precision; the provision of such a method which reduces the number of externally exposed shaft bearings to minimize leakage; and the provision of such a method which reduces the number of steps to complete manufacture of the landing gear.

In general, one embodiment of the invention is directed to landing gear for selectively supporting a semitrailer. The landing gear includes a leg having an upper section and a lower section in telescoping arrangement with each other and a lead screw mounted for extending and retracting the upper and lower sections relative to each other upon rotation of the lead screw. The landing gear also includes an input shaft for applying a torque to the lead screw to drive rotation thereof, the input shaft being rotatable about a first rotation axis and movable in translation along the first rotation axis for shifting between a first position for low gear operation and a second position for high gear operation. The landing gear also includes an output shaft including an output gear for transmitting torque to the lead screw, the output shaft being mounted for rotation about a second rotation axis and being generally axially aligned with the input shaft. The landing gear also includes a gearing subassembly configured so that for each rotation of the input shaft, the output shaft rotates less than one rotation for low gear operation and interconnecting the generally axially aligned input and output shafts in the second position so that for each rotation of the input shaft, the output shaft rotates more than one rotation, whereby the gearing subassembly augments lift when the input shaft is in the first position and augments speed in the second position.

The invention is also directed to landing gear for selectively supporting a semitrailer. The landing gear includes a leg having an upper section and a lower section in telescoping arrangement with each other and a lead screw mounted for extending and retracting the upper and lower sections relative to each other upon rotation of the lead screw. The landing gear also includes an input shaft rotatable about a first rotation axis and an output shaft rotatable about a second rotation axis and connected for driving rotation of the lead screw. The landing gear further includes an idler shaft rotatable about a third rotation axis and gearing associated with the input shaft, output shaft, idler gear and lead screw for operatively connecting input shaft to the lead screw for driving rotation thereof. The landing gear also includes a bearing member located within the upper section of the leg and including a bearing element bearing the idler shaft for rotation, the bearing member being supported by the upper section at a location above the location of the bearing element.

Another embodiment of the invention is directed to landing gear for selectively supporting a semitrailer. The landing gear includes a leg having an upper section and a lower section in telescoping arrangement with each other and a lead screw mounted for extending and retracting the upper and lower sections relative to each other upon rotation of the lead screw. The landing gear also includes an input shaft rotatable about a first rotation axis and movable in translation along the first rotation axis for shifting between a first position for low gear operation and a second position for high gear operation and an output shaft mounted for rotation about a second rotation axis. The landing gear further includes a first idler shaft mounted for rotation about a first idler shaft axis spaced from the axis of rotation of the input shaft and a second idler shaft mounted for rotation about a second idler shaft axis spaced from the axis of rotation of the input shaft. The input shaft and the first idler shaft are arranged such that in the first position torque from the input shaft is transmitted through the first idler shaft to the lead screw and the output shaft and the input shaft and the second idler shaft are arranged such that in the second position torque from the input shaft is transmitted through the second idler shaft to the output shaft and lead screw.

Another embodiment of the invention is directed to landing gear for selectively supporting a semitrailer. The landing gear includes a leg having an upper section and a lower section in telescoping arrangement with each other. The upper section has opposing walls, a first of the walls having a slot therein at an upper end. The landing gear also includes a lead screw mounted for extending and retracting the upper and lower sections relative to each other upon rotation of the lead screw and an input shaft rotatable about a first rotation axis and connected in operation to the lead screw for driving rotation thereof. The input shaft extends into the upper section of the leg through the slot in the first wall. The landing gear further includes a cover plate attached to the upper section generally over the slot, the cover plate including a bearing receiving the input shaft there through.

Another embodiment of the invention is directed to a method of assembling a landing gear leg. The method includes the steps of mounting at least one shaft on a bearing located in a bearing member and inserting the bearing member mounting the shaft into an upper section of the landing gear leg.

Another embodiment of the invention is directed to a subassembly for use in manufacturing a landing gear leg. The subassembly includes a bearing member adapted to be mounted on the leg in an open top thereof and a shaft mounted on the bearing member for rotation. The subassembly also includes gearing associated with the shaft for use in transmitting rotation, whereby the shaft and gearing are supported for rotation independently of mounting in the leg.

BRIEF DESCRIPTION OF THE DRAWINGS

FIG. 14 is a bottom side perspective of a top cover of the single idler landing gear leg;

Corresponding reference characters indicate corresponding parts throughout the several views of the drawings.

DETAILED DESCRIPTION OF THE PREFERRED EMBODIMENTS

Figure 1:
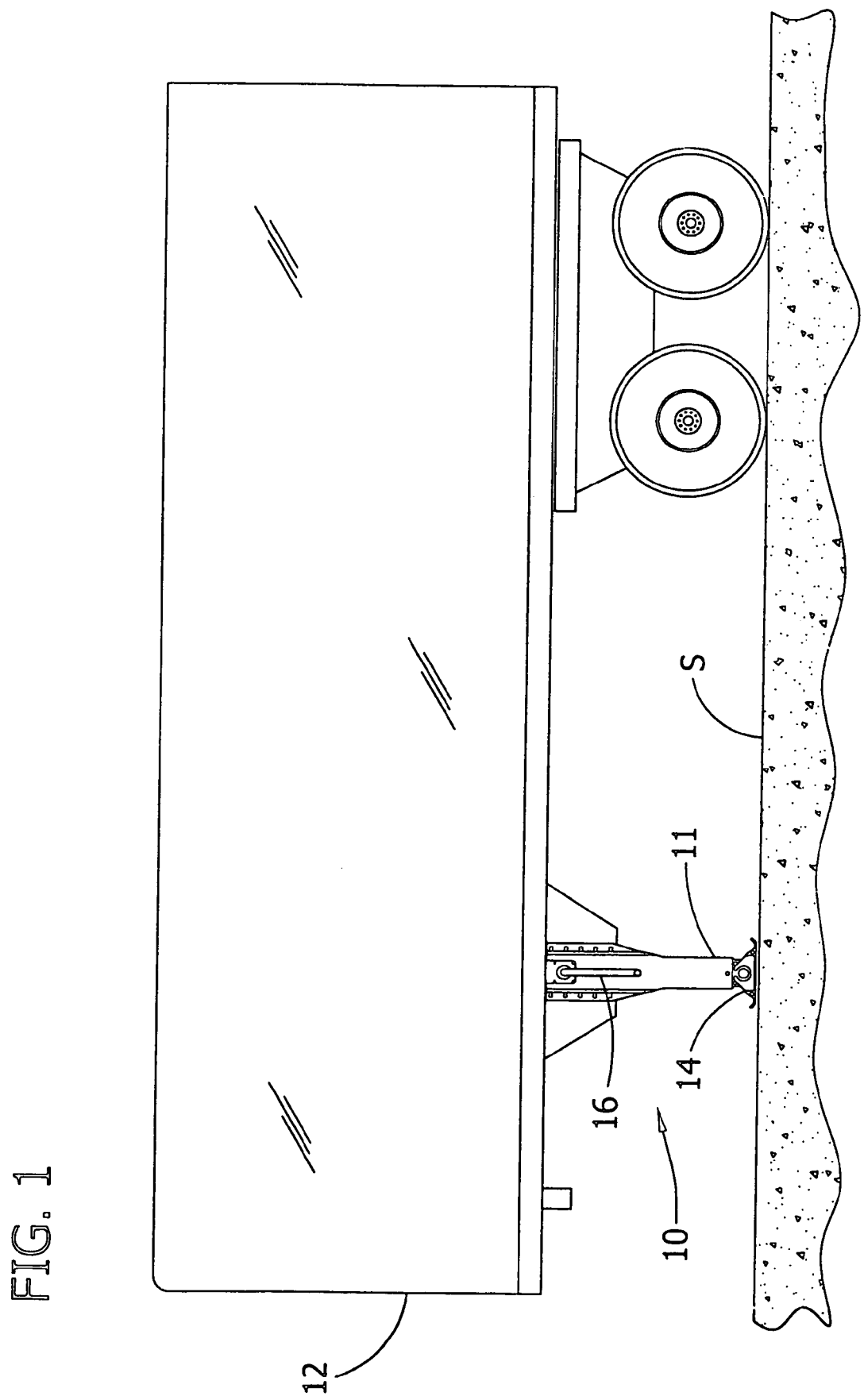
FIG. 1 is a side elevation of a semitrailer unhitched from its truck tractor, and having landing gear thereon supporting the front end of the semitrailer.
Figure 2:
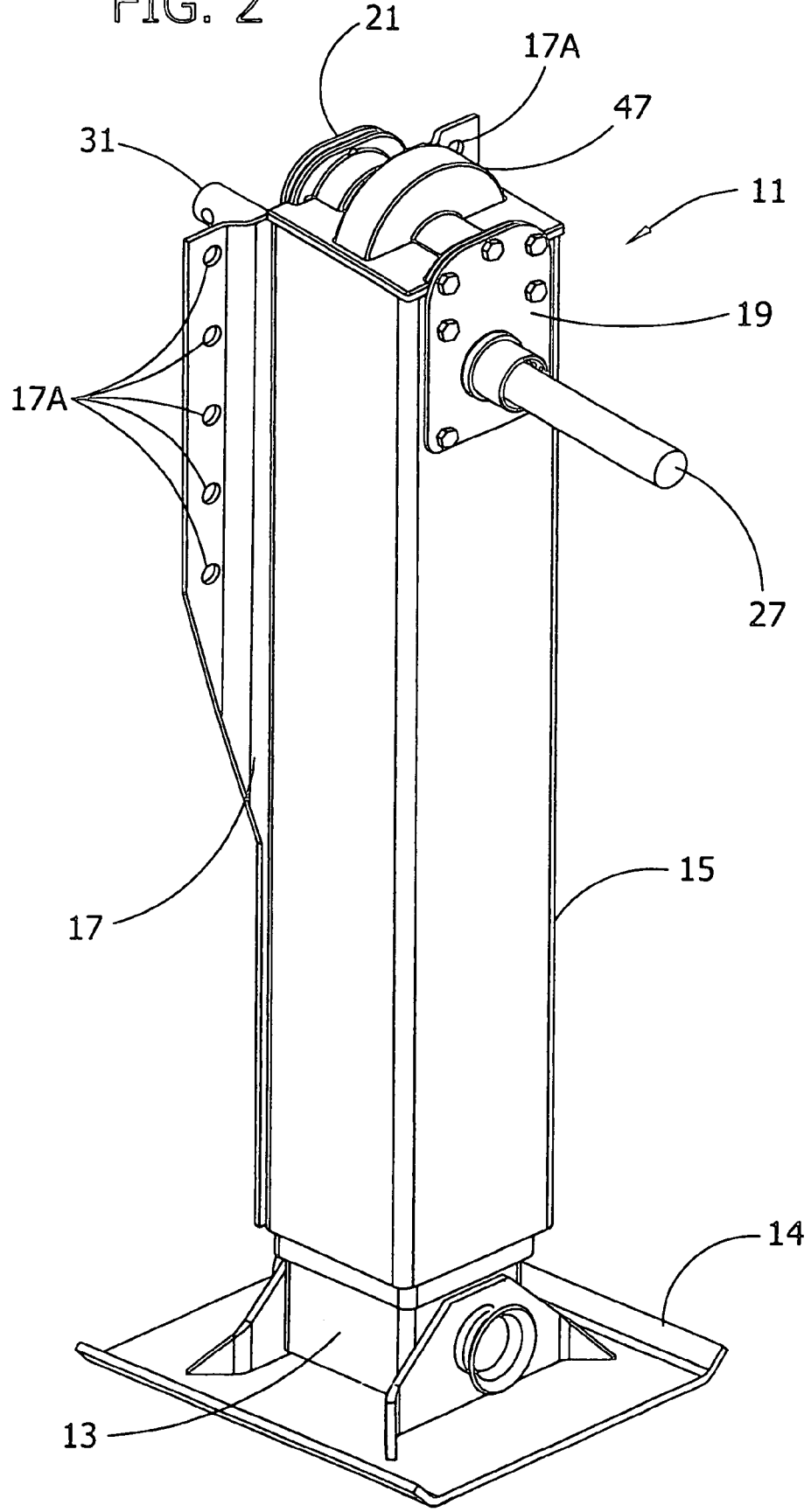
FIG. 2 is an enlarged perspective view of a landing gear leg of the landing gear depicted in FIG. 1.
Figure 3:
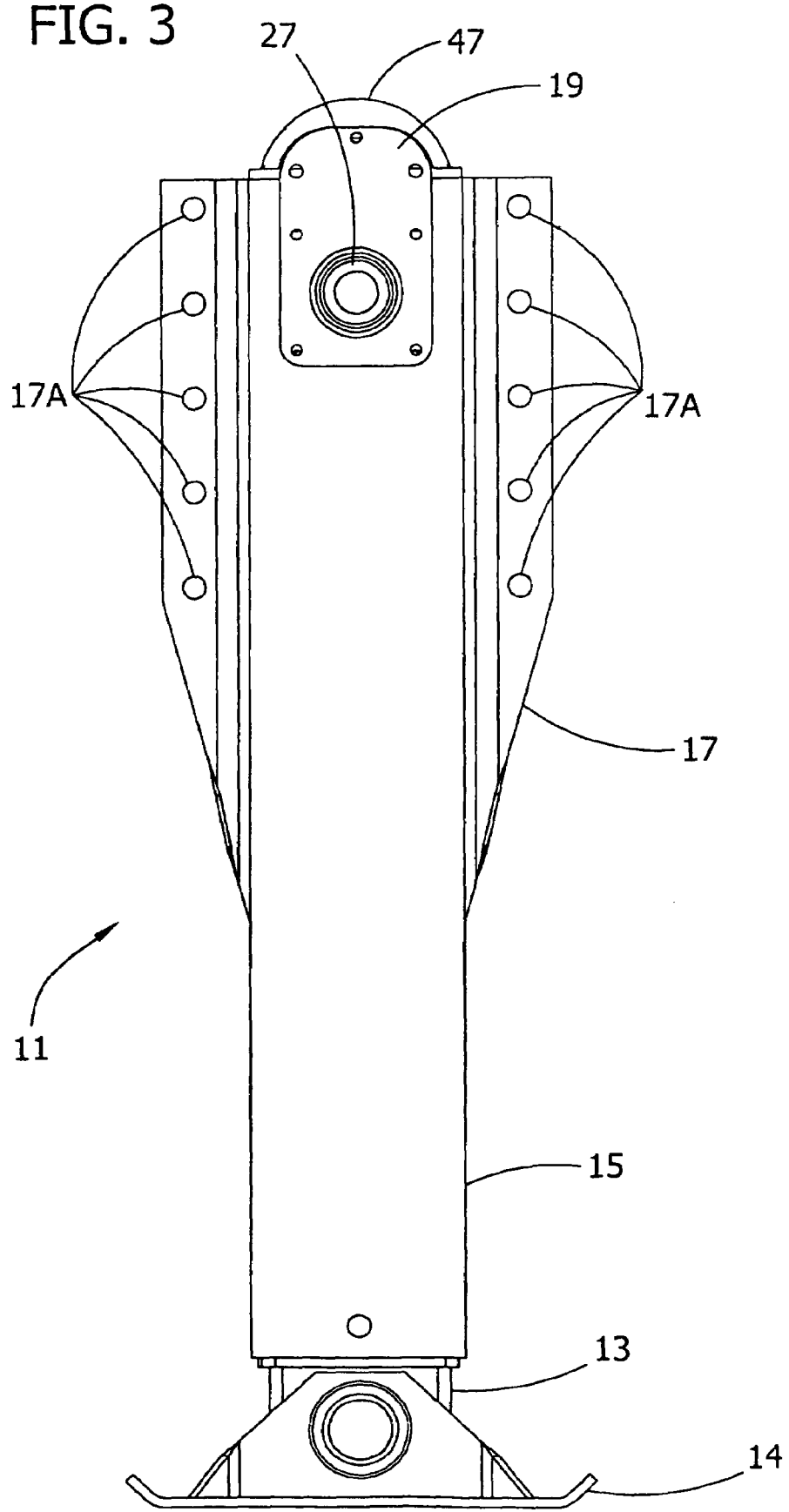
FIG. 3 is a front side elevation of the landing gear leg of FIG. 2.
Figure 4:
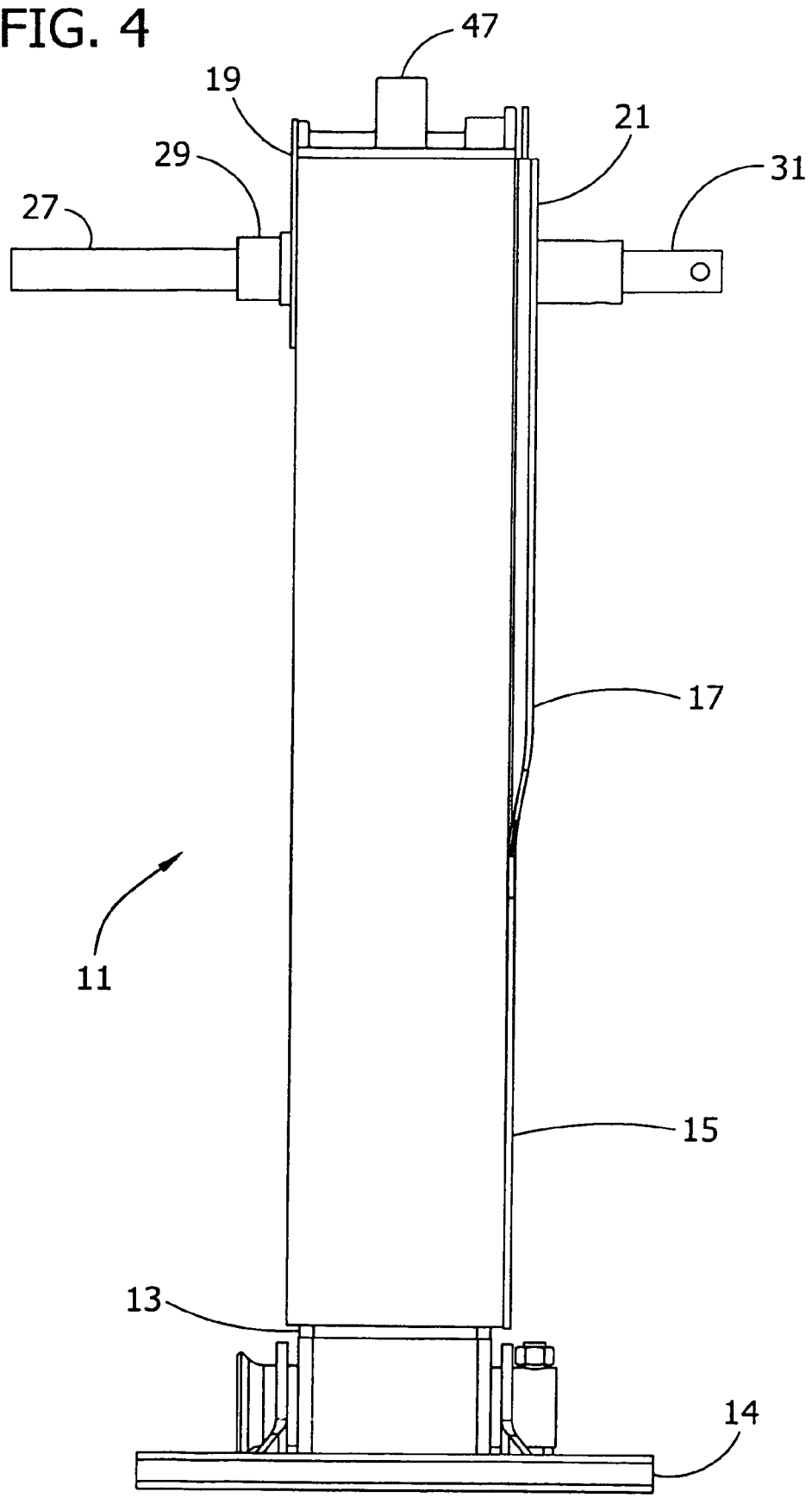
FIG. 4 is a right side elevation of the landing gear leg of FIG. 2.

FIG. 1 illustrates landing gear, indicated generally at 10, for the support of semitrailers when not attached to a tractor. The landing gear 10 typically includes a pair of legs 11 (only one leg is shown) located near respective front corners of a semitrailer 12. Each leg 11 is capable of extending to engage the pavement S or other supporting surface to hold up the front end of the semitrailer as is well understood in the art. A shoe 14 of the landing gear 10 is pivotally mounted on the leg 11 for engaging the pavement S. The legs 11 are also capable of retracting to move up out of the way when the semitrailer 12 is being pulled over the road by a tractor (not shown). A crank handle 16 is used to extend and contract the length of the leg 11, as will be described below. The following description is confined to one of the legs 11. The other leg (not shown) has a similar construction, but if it is connected to gearing of the illustrated leg such as by an output shaft extending underneath the front of the semitrailer 12, the other leg need not have some of the gearing present in the illustrated leg. Such constructions are well understood by those of ordinary skill in the art and will not be further described herein.

Referring to FIGS. 2-5, the landing gear leg 11 includes a lower leg section 13 (FIG. 5) telescopingly received in an upper leg section 15. The lower leg section 13 is a steel square tube. The upper leg section 15 is preferably a square tube made of steel or other like material. The upper leg section 15 has internal dimensions larger than that of the lower leg section 13 so that the lower leg section is telescopingly received in the upper leg section. The lower and upper leg sections 13, 15 could also have other cross sectional shapes, such as rectangular, round or the like. In an alternate version, the upper leg section is a steel channel having an open front side extending the length of the upper leg section. A mounting plate 17 for attaching the leg 11 to the trailer 12 is attached by bolts and/or welding to the upper leg section 15. Holes 17A in the mounting plate 17 may receive fasteners (not shown) for attaching the leg 11 to the trailer 12. The leg 11 can be attached to the trailer in either a "conventional mount" and "reverse mount". These labels will be understood by those of ordinary skill in the art and will not be discussed further.

Figure 5:
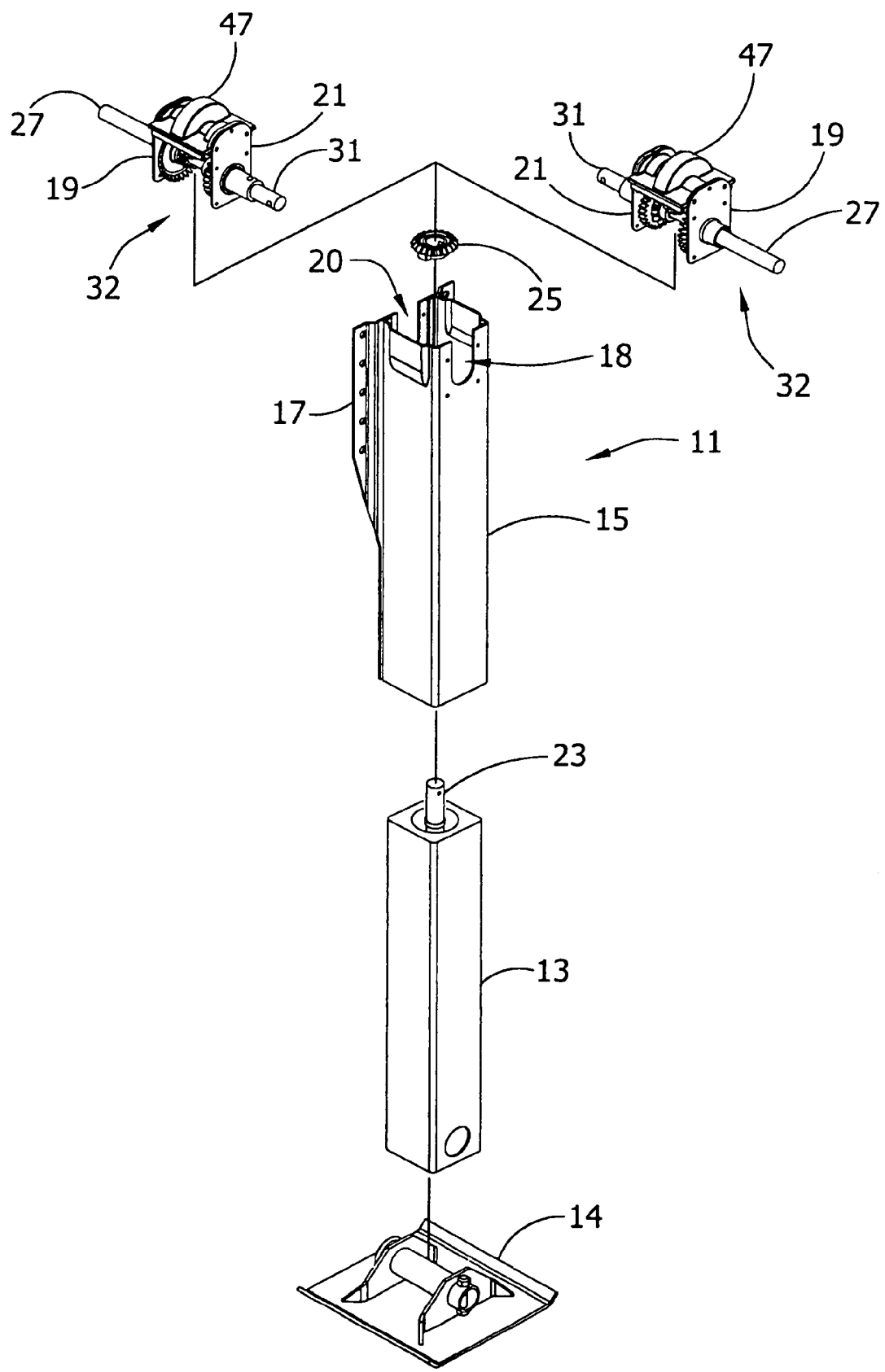
FIG. 5 is an exploded perspective view of the landing gear leg of FIG. 2 capable of receiving a gearing subassembly for both conventional and reverse mounted legs.

FIG. 5 illustrates that the upper leg section 15 has two U-shaped cutouts 18, 20 extending axially downward from the upper end of the upper leg section on opposite sides of the upper leg section. In the final assembly, the cutouts 18 and 20 are closed by an outside cover plate 19 and an inside cover plate 21, respectively. For illustrative purposes, with the conventionally mounted leg 11, the "outside" cover plate 19 faces out to the side of the semitrailer and the "inside" cover plate 21 faces in toward the center of the semitrailer. The upper leg section 15 is formed with two pockets 22 extending outward from the upper leg section on opposite sides of the upper leg section. The pockets 22 are formed on the sides of the upper leg section that do not have the cutouts 18,20. The pockets 22 are sized to accommodate an idler gear as will be described below.

The lower and upper leg sections 13, 15 are connected together by a lead screw 23 (only the very upper portion of which is illustrated in FIG. 5) for extension and retraction of the lower leg section 13 relative to the upper leg section 15 upon rotation of the lead screw. The lead screw 23 has a bevel gear 25 mounted on its upper end for use in driving the lead screw as will be described. The landing gear leg 11 includes an input shaft 27 received through the outside cover plate 19 into the leg and an output shaft 31 received through the inside cover plate 21 of the leg. The input shaft 27 and output shaft 31 are connected together a subassembly 32 further including gearing as will be described below. More specifically, the gearing subassembly 32 is preferably constructed and arranged to fit substantially within the cross sectional area of the upper leg section 15. In one embodiment, the output shaft 31 would extend to the aforementioned other leg (not shown) of the landing gear to drive the rotation of the lead screw in that leg. The crank handle 16 (FIG. 1) is preferably attached to the outer end of the input shaft 27 for manually applying torque to rotate the input shaft.

Assembly of the landing gear leg 11 may performed by dropping the top cover 47 and associated components of the subassembly 32 onto the open top of the upper leg section 15. Thus, in one preferred embodiment, the gearing components of the subassembly, such as the idler shafts, the output gear, the pinion gear and the large diameter input gear, as will be described below, are all received within the upper leg section 15. The input shaft 27 passes through the cutout 18 on the outside of the upper leg section 15 and the output shaft 31 passes through the cutout 20 on the inside of the upper leg section. Cover plate bolts extend through holes in respective cover plates 19, 21 and into the top cover 47 to secure the subassembly 32 to the leg 11. The cover plates 19, 21 may also be welded to the upper section 15 and/or a gasket (not shown) may be provided between the cover plate (19, 21) and upper section.

Preferably, the leg 11 is constructed selectively for either conventional mounting on a semitrailer or reverse mounting by turning the subassembly 32 to the upper section 15 through 180 degrees. Nothing else about the construction of the leg changes, which simplifies manufacturing. It maybe seen that the upper end of the upper leg section 15 has the opposite laterally outwardly formed pockets 22. In addition, the front side of the upper leg section 15 has an outwardly formed portion 24. The pockets 22 provide space for the gears of the idler shafts (not shown) without regard to the orientation of the subassembly 32. The outwardly formed portion 24 keeps the distance from a center of the upper section 15 to the respective cutouts 18, 20 equal. Thus, a beveled pinion gear member (described below with reference to FIG. 9) in the subassembly 32 will mesh with the bevel gear 25 at the top of the lead screw 23 no matter which direction the top cover subassembly is oriented. FIG. 5 shows the top cover subassembly 32 oriented for both conventional mount and for reverse mount. In either orientation, the subassembly 32 can be dropped into the open top of the upper leg section 15 for assembling the leg 11.

Figure 6:
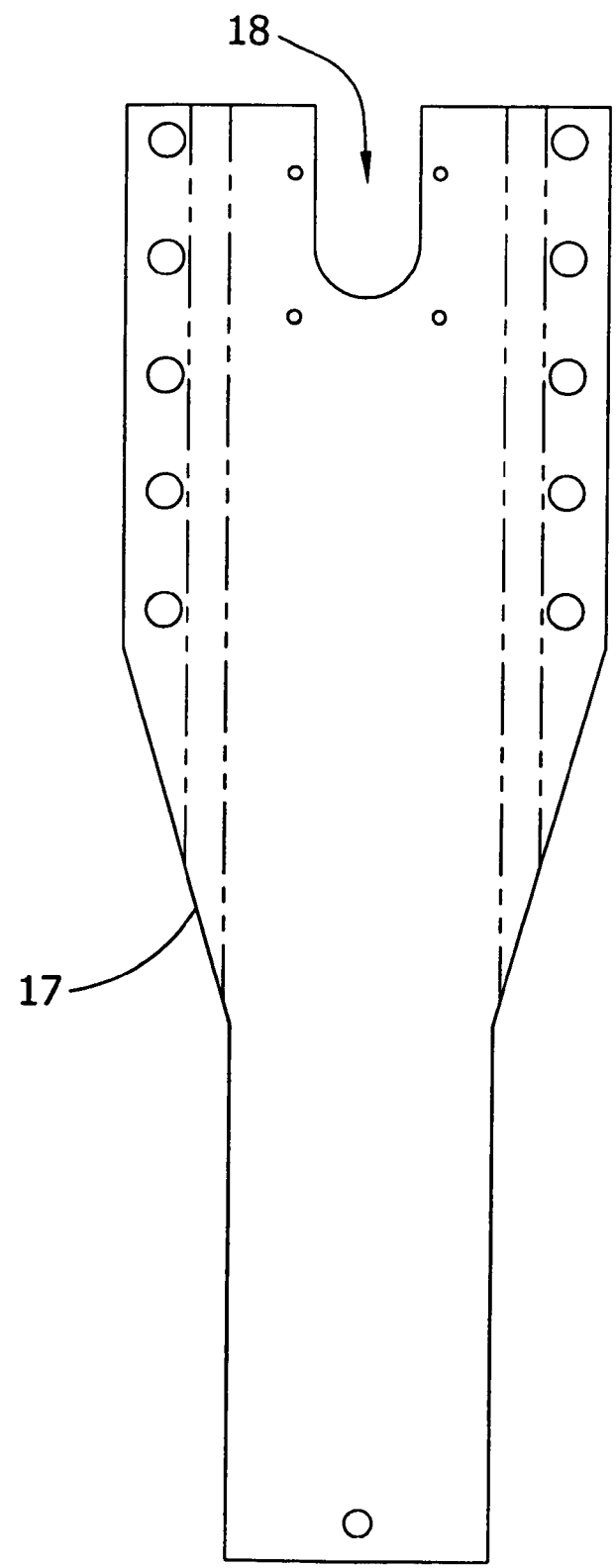
FIG. 6 is a side elevation of a mounting plate of the landing gear leg of FIG. 2.
Figure 7:
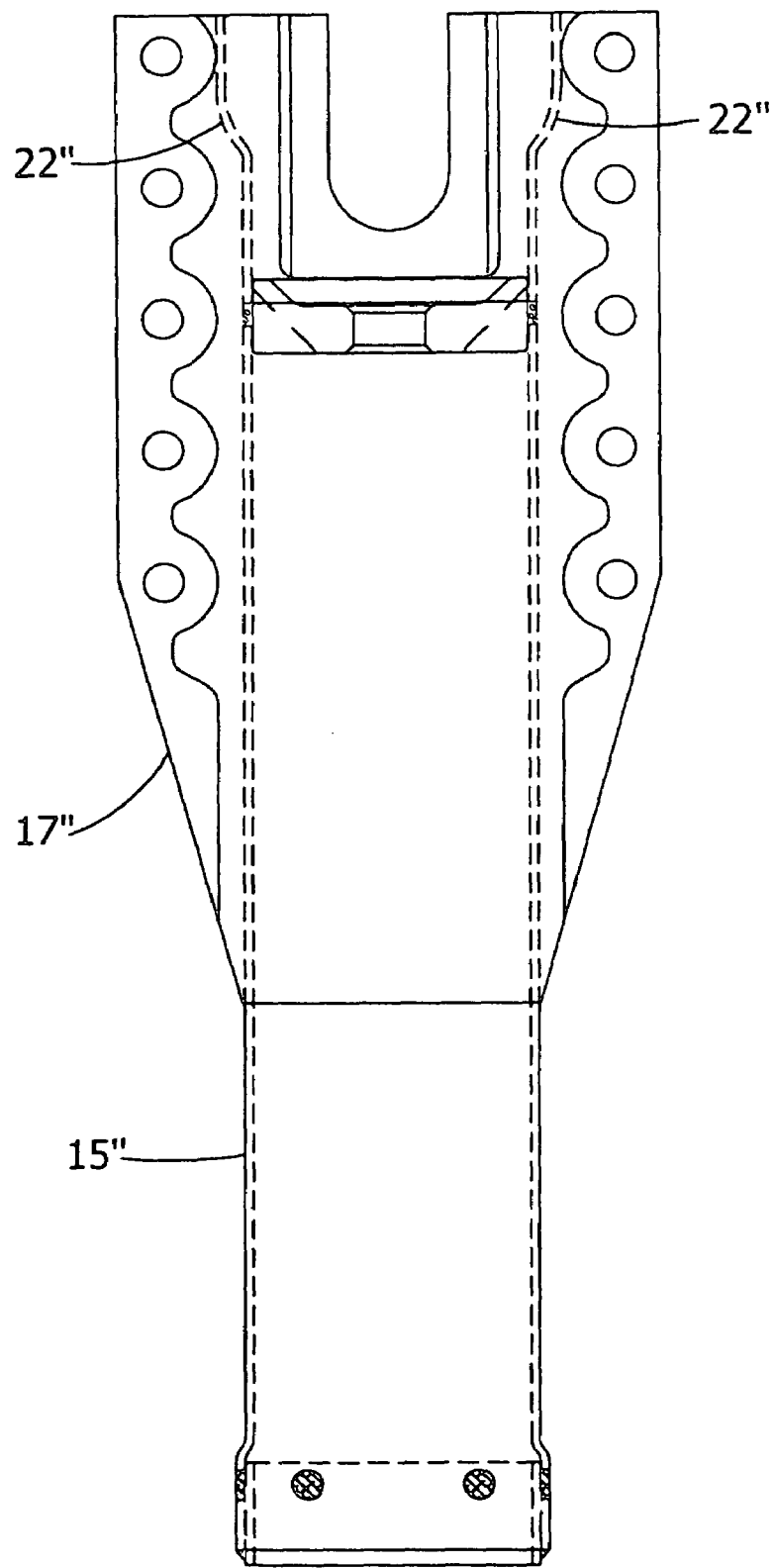
FIG. 7 is a side elevation of an upper portion of the landing gear leg.
Figure 8:
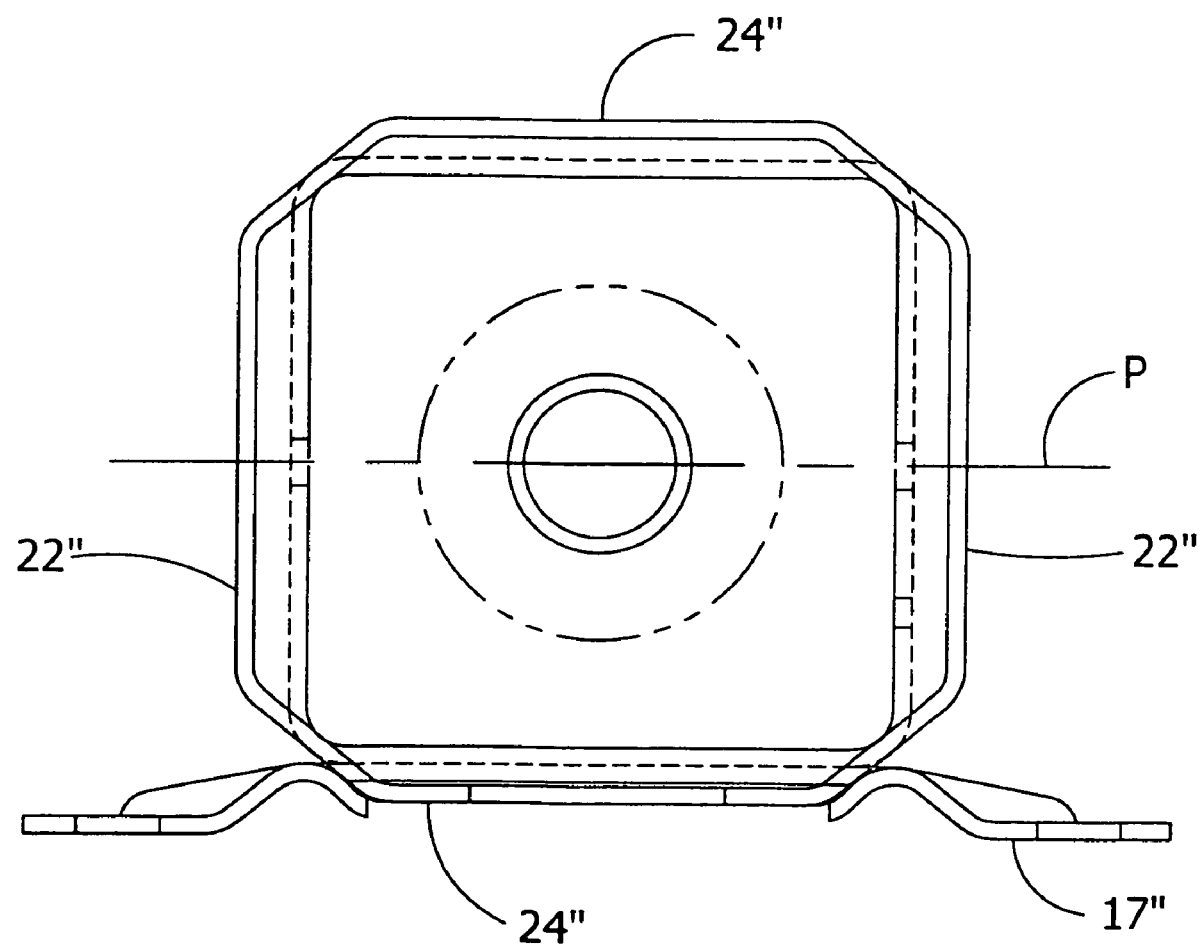
FIG. 8 is a plan view of an upper section of the landing gear leg.

FIG. 6 illustrates a mounting plate 17' used with an upper leg portion (not shown) shaped as a channel and is configured to cover the open front side of the upper leg portion. FIGS. 7 and 8 illustrate a modified version of an upper section 15" of a landing gear leg having the shape of a square tube. The upper section 15" has a mounting plate 17" attached thereto. The upper end of the upper section 15" is belled outwardly to form pockets 22" and outwardly formed portions 24". The pockets 22" and outwardly formed portions 24" extend over a substantial portion of the width of their respective side walls. Otherwise, the construction of the upper section 15" is substantially the same as upper section 15. The upper leg section 15 at its upper end is symmetrical about a central plane P.

Figure 9:
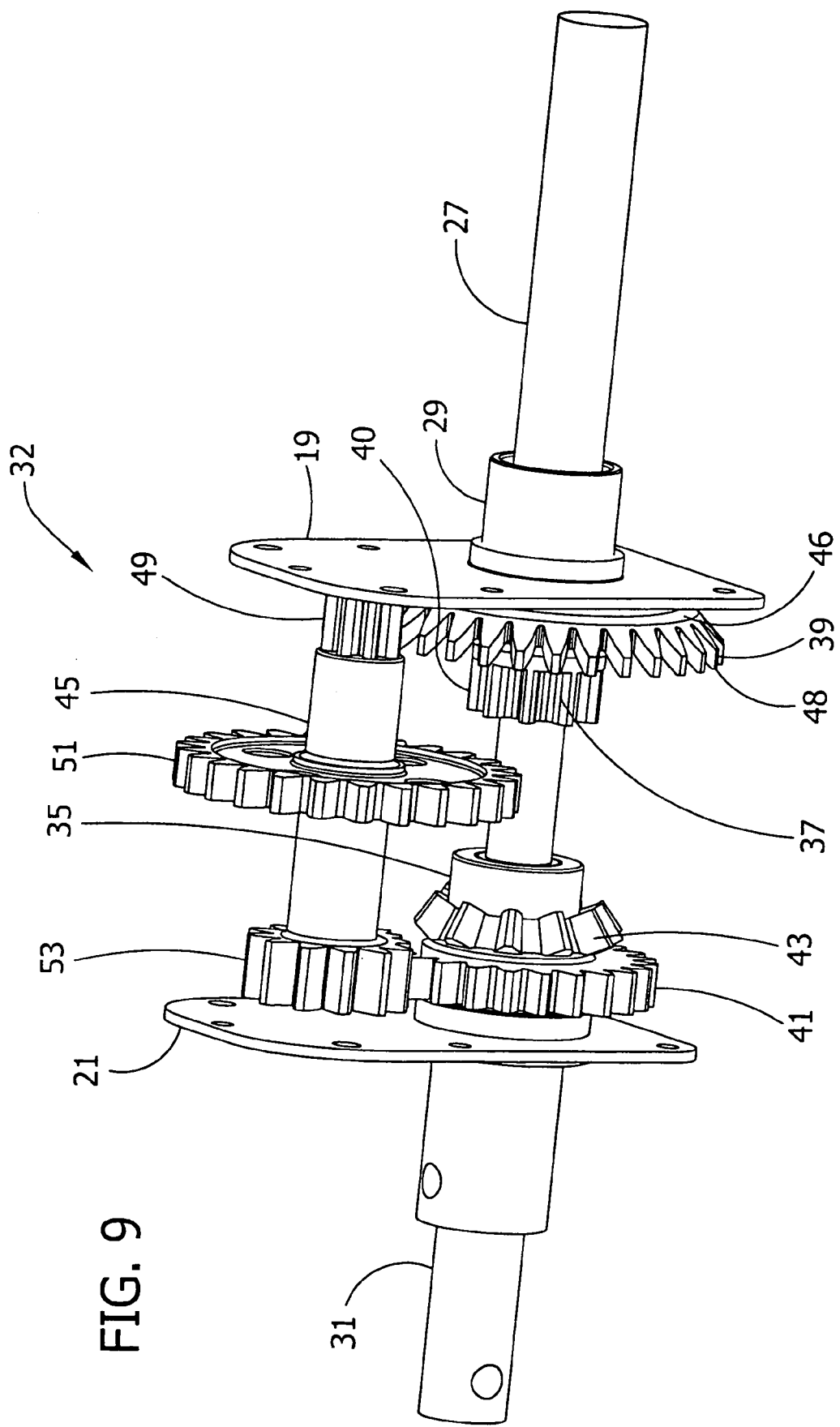
FIG. 9 is a bottom side perspective of a top cover and associated idler shaft and gearing of a single idler landing gear leg according to one embodiment of the invention.
Figure 10:
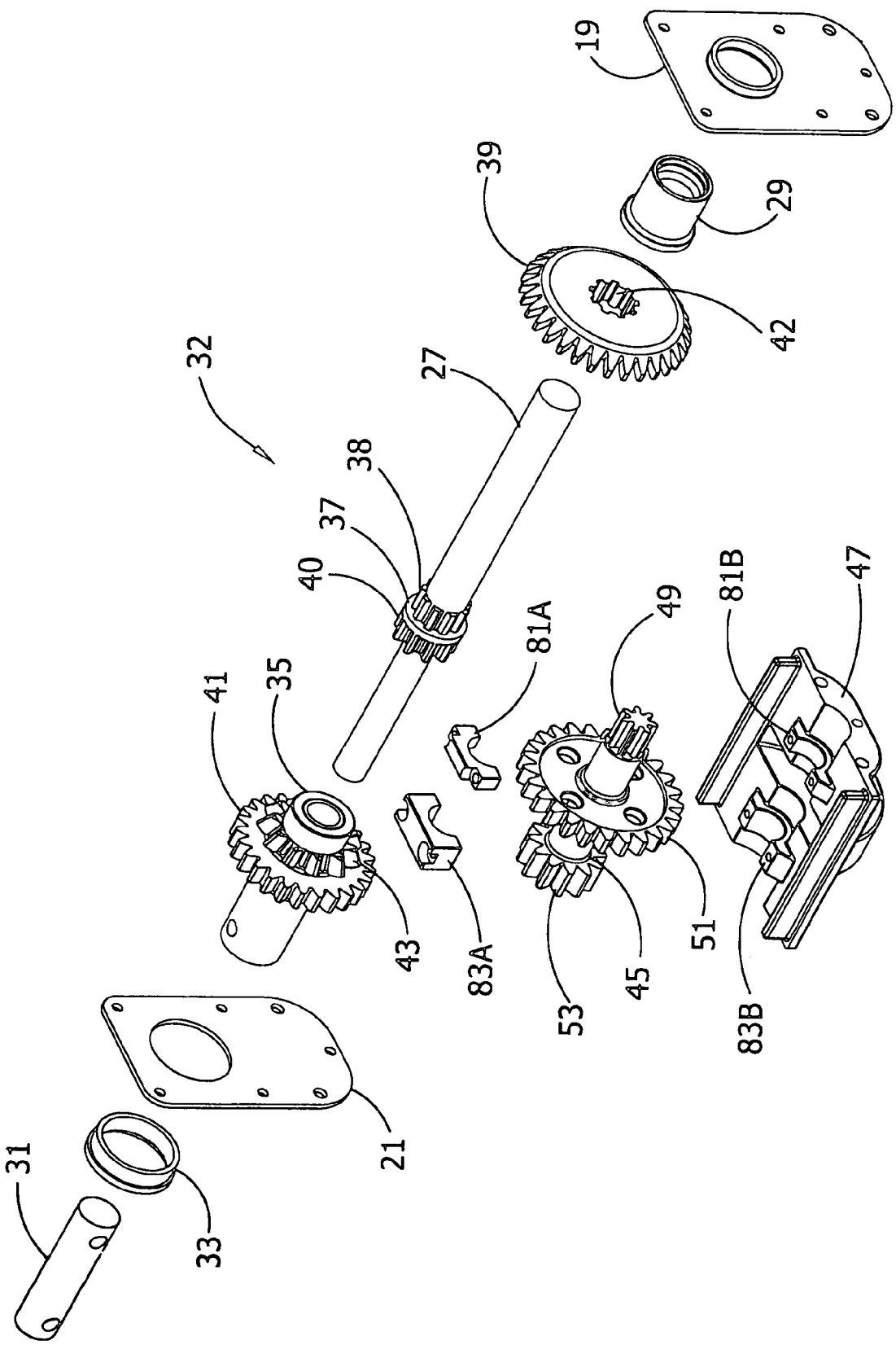
FIG. 10 is an inverted view of the top cover and idler shaft of FIG. 9 with the parts exploded to illustrate assembly.

FIGS. 9-16 illustrate a subassembly, generally designated at 32, and parts thereof separately and in combination with the leg 11. Referring to FIGS. 9 and 10, the subassembly 32 comprises a single idler shaft 45 (FIG. 13) for mechanically connecting the input shaft 27 with the output shaft 31. The input shaft 27 is received through a bearing 29 in the outside cover plate 19 into the leg 11 and the output shaft 31 is received through a bearing 33 in the inside cover plate 21 of the leg. The top cover 47 has been removed from FIG. 9 for clarity.

The inner end of the input shaft 27 has a reduced diameter and is received and borne in an axial opening of an output gear 35 of the output shaft 31 for free rotation relative to the output gear and for axial movement relative to the output gear. Alternately, the output shaft has a reduced diameter end portion (not shown) which is received in an axial opening in the input shaft, or the shafts could be supported independently of each other. Thus, the input and output shafts 27, 31 are coaxial. The bearing 29 supporting the input shaft 27 in the outside cover plate 19 permits the input shaft to both rotate and move axially relative to the bearing. As to axial movement, a ball and spring mechanism (not shown) is provided to engage the bearing 29 to releasably lock the input shaft 27 in two axial positions, corresponding to low gear (FIG. 11) and high gear (FIG. 12), respectively.

The input shaft 27 carries a pinion gear 37 which is pinned to the reduced diameter portion of the input shaft for conjoint rotation with the input shaft. It is contemplated that the pinion gear 37 could be formed as one piece with the input shaft 27. The pinion gear 37 has a small diameter, and has a first set of gear teeth 38 and a second set of gear teeth 40. The input shaft 27 also mounts a large diameter input gear 39 for free rotation relative to the input shaft, except as will be described, but which is held from movement along the axis of the input shaft relative to the upper leg section 15. A central, internally toothed opening 42 of the input gear 39 has a diameter which is larger than the input shaft 27 for receiving a part of the pinion gear 37 into the central opening. The large diameter input gear 39 includes a flat central portion 46 and an angled outer portion 48. This construction permits the large diameter gear 39 to fit closely against the outside cover plate 19 and between the outside cover plate and the bevel gear 25 of the lead screw 23. The annular outer portion 48 of the large diameter gear 39 angles outwardly and has teeth formed therein for meshing with another gear as will be described.

The output gear 35 is pinned to the output shaft 31 for conjoint rotation. The output gear 35 includes first gear member 41 which receives input torque to drive the gear and a second beveled pinion gear member 43 which is meshed with the bevel gear 25 of the lead screw 23. The first gear member 41 is substantially planar and fits close against the inside cover plate 21 and between the bevel gear 25 and the cover plate. As illustrated, the output gear 35 is formed as a single piece of tubular material. However, it may be formed from multiple pieces which are separated and secured to a common tube, or directly to the output shaft 31.

Figure 11:
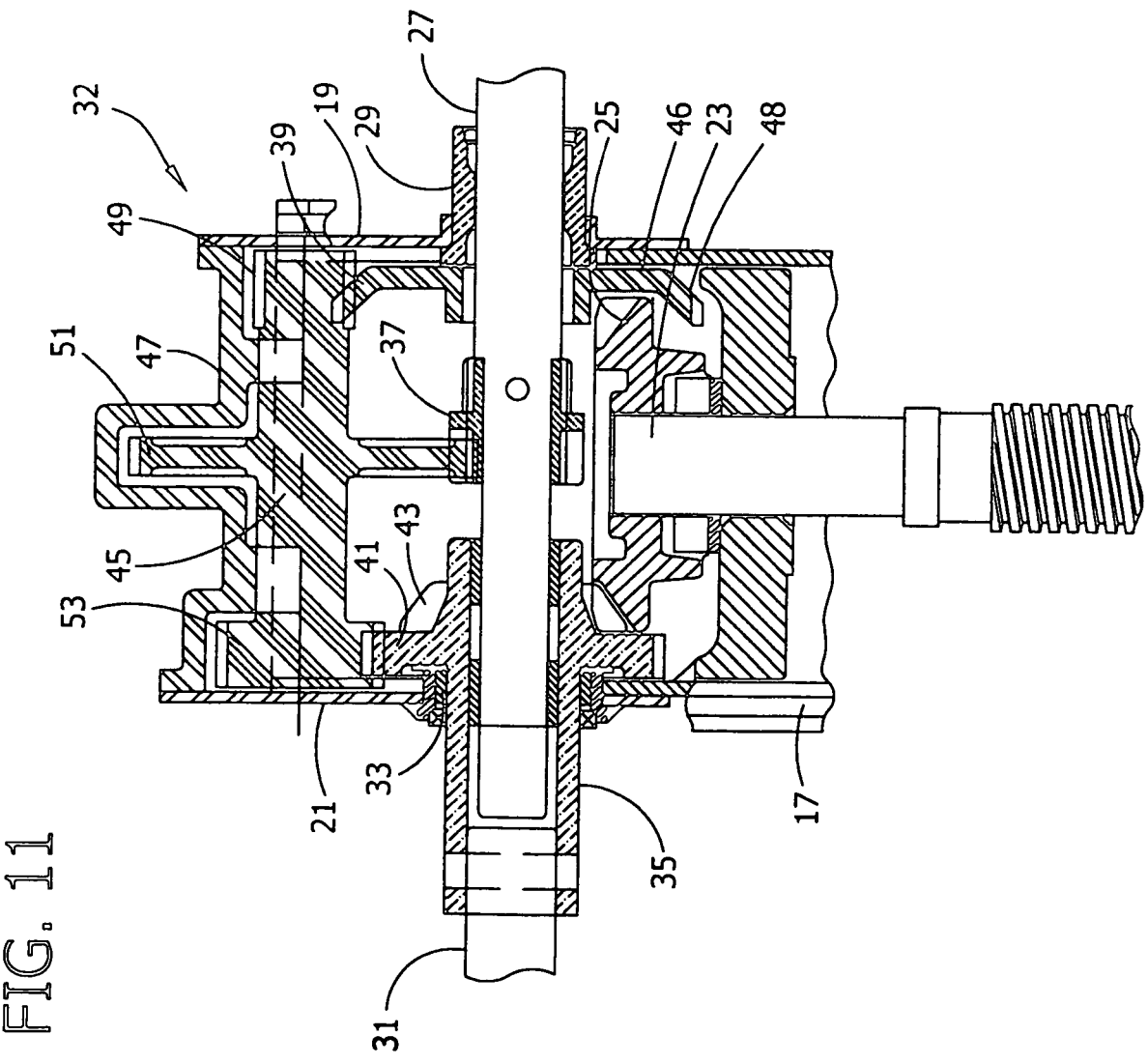
FIG. 11 is a schematic fragmentary cross section of the single idler landing gear leg of FIG. 9 with the input shaft in the low gear position.
Figure 12:
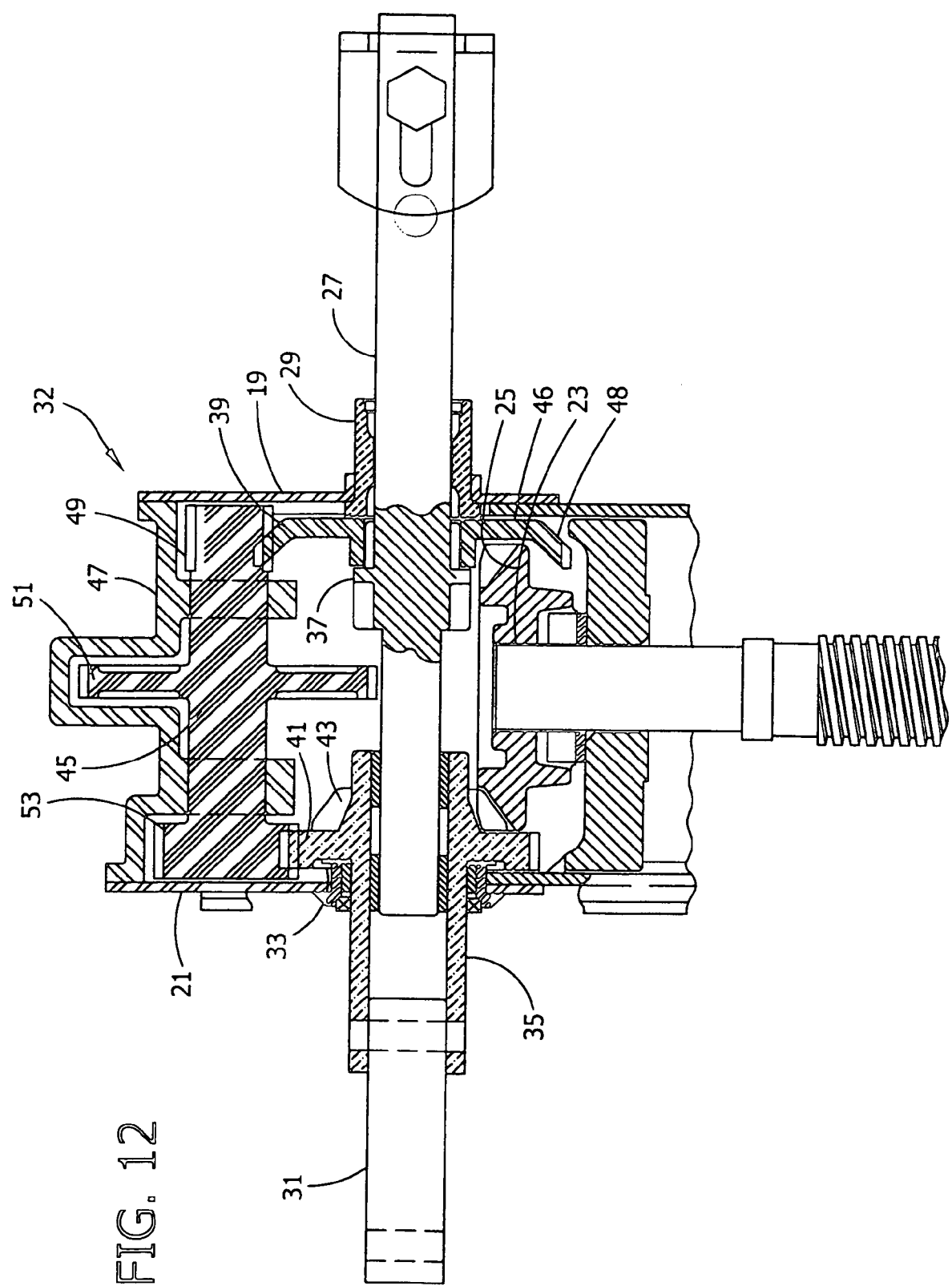
FIG. 12 is a schematic fragmentary cross section of the single idler landing gear leg of FIG. 9 with the input shaft in the high gear position.
Figure 13B:
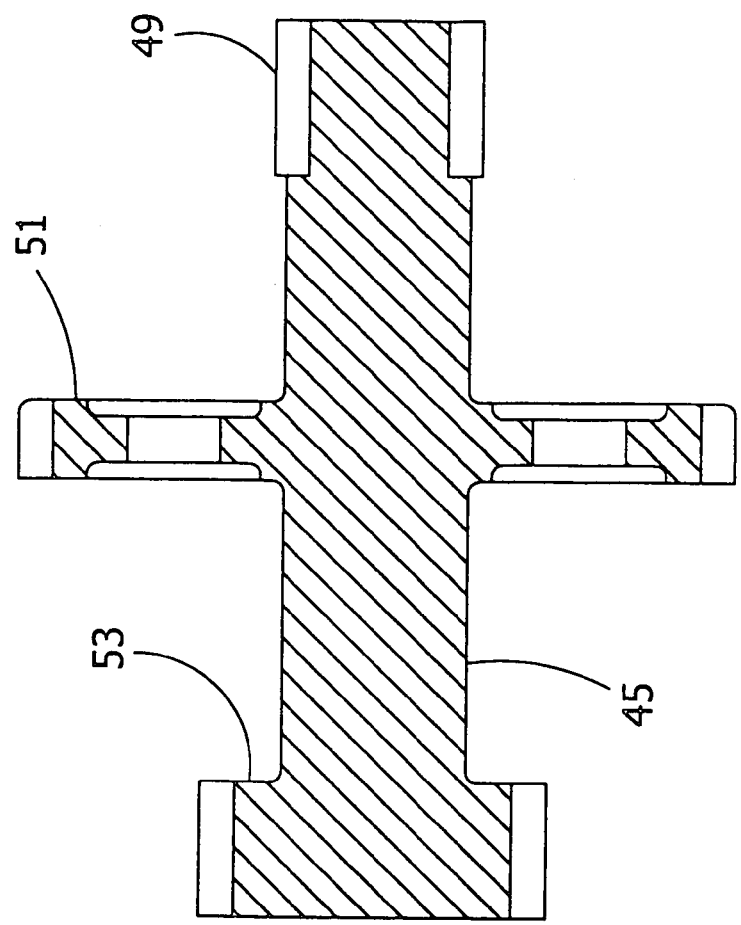
FIG. 13B is a sectional view of the idler shaft taken along line 13B-13B of FIG. 13A.
Figure 13A:
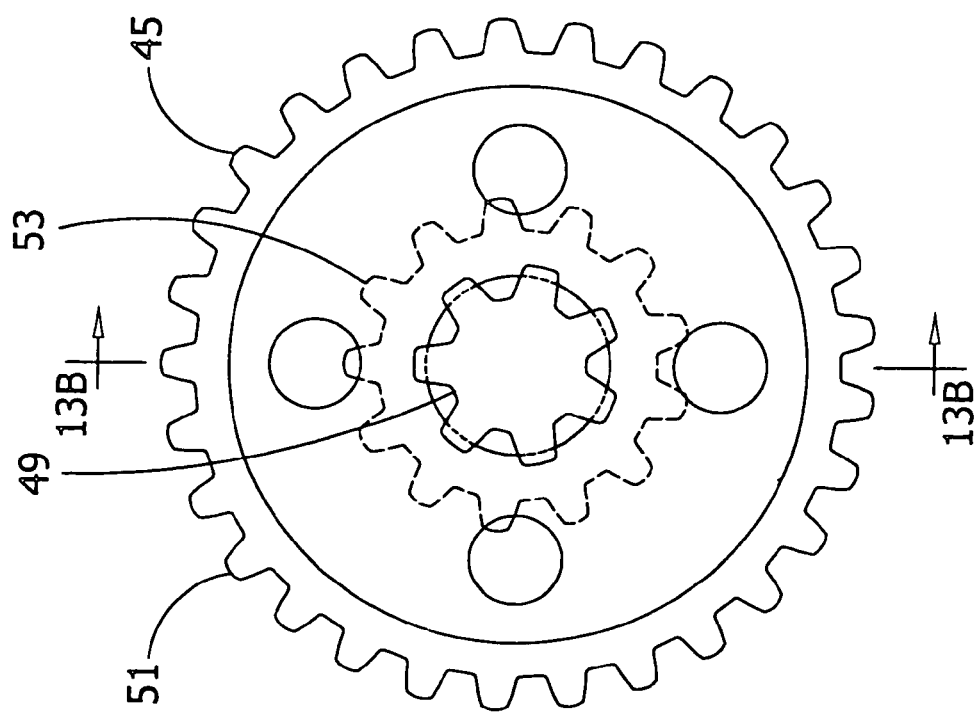
FIG. 13A is an end view of the idler shaft of the single idler landing gear of FIG. 9.

Driving connection of the input shaft 27 with the output gear 35 is achieved by way of an idler shaft 45 having three idler gears formed as one piece with the shaft. It would be possible to form the gears separately from the shaft and connect them to the shaft. As shown in FIGS. 11 and 12, the idler shaft 45 is supported for rotation within the upper leg section 15 by a top cover 47. In certain statements of the present invention, the top cover 47 may be considered to be a "bearing member". The top cover will be described more fully hereinafter. A first idler gear 49 has the smallest diameter of the gears on the idler shaft and is permanently meshed with the large diameter input gear 39. A second idler gear 51 has the largest diameter and is located generally in the middle of the idler shaft 45 for selective engagement with the teeth 40 of the pinion gear 37 of the input shaft 27. A third idler gear 53 located at the far left end of the idler shaft 45 has a diameter between that of the first and second idler gears and is permanently meshed with the first gear member 41 of the output gear 35.

Figure 15:
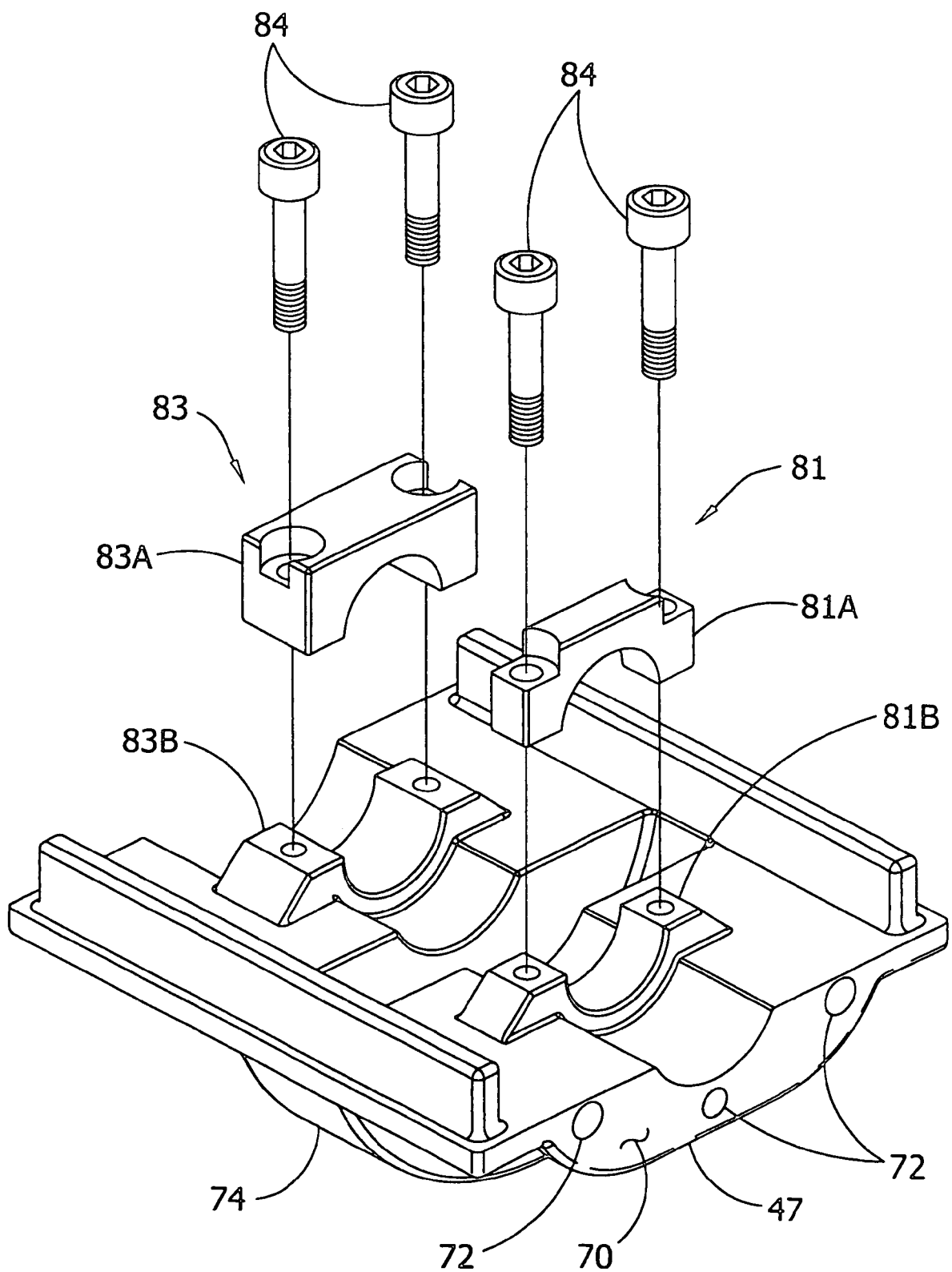
FIG. 15 is an inverted perspective view of the top cover of FIG. 14 with the parts exploded to illustrate assembly.

Referring to FIGS. 14 and 15, a top cover 47 of the single idler landing gear leg 11 is formed to rotatably mount the idler shaft 45. Preferably, it is not necessary to have additional openings in the exterior of the leg 11 through which rotating shafts are received, which are prime locations for leaking lubricant. The top cover 47 is made either partially or entirely of a polymeric material such as nylon. However, it is contemplated that the top cover 47 may be made of other suitable materials, such as a ductile iron casting or aluminum casting, without departing from the scope of the present invention. It is believed no separate bearings will be necessary if the top cover 47 is made of nylon or a like material. In one version, side flange 70 of the top cover 47 has openings 72 therein for receiving bolts or screws to secure the cover plate 19 (see FIG. 10) to the top cover. The top cover has a first outwardly formed pocket 74 extending from a top surface 75 thereof. The pocket 74 provides space for receiving the second idler gear 51 (see FIG. 10). The top cover 47 also has a second outwardly formed pocket 76 extending from the top surface 75 for receiving the third idler gear 53. Side flange 78 of the top cover 47 has openings (not shown) therein for receiving bolts or screws to secure the cover plate 21 (see FIG. 10) to the top cover.

Referring now to FIG. 15, the top cover 47 includes a first yoke 81 which receives a section of the idler shaft 45 between the first idler gear 49 and the second idler gear 51, and a second yoke 83 which receives a section of the idler shaft between the second idler gear and the third idler gear 53. The first and second yokes 81, 83 each have a lower portion 81A, 83A which can be separated from an upper portion 81B, 83B to place the idler shaft 45 in the top cover 47. Bolts 84 may be used to connect the lower portions 81A, 83A to respective upper portions 81B, 83B. The gearing subassembly 32, top cover 47, outside cover plate 19, inside cover plate 21, input shaft 27, and output shaft 31 may be subassembled and dropped into the upper leg section 15 as shown in FIG. 5.

Referring again to FIGS. 11 and 12, the operation of the landing gear is as follows. Assuming the lower leg section 13 (FIG. 2) is retracted into the upper leg section 15 and is to be extended, the driver first moves the input shaft 27 axially outwardly to the position shown in FIG. 12. In this position, the pinion gear 37 is partially received in the central opening 42 of the large diameter input gear 39. The use of a small pinion gear 37 is adopted from co-assigned U.S. Pat. No. 4,187,733, the disclosure of which is incorporated by reference. The first set of teeth 38 on the right side of the pinion gear 37 mesh with the internal teeth of the large diameter gear 39 so that the large diameter gear is now fixed for conjoint rotation with the input shaft 27. Thus, the engagement of the large diameter gear 39 with the first idler gear 49 is a driving engagement. As is understood by those of ordinary skill in the art, the idler shaft 45 will be rotated more rapidly than the input shaft 27. The torque is transmitted by the idler shaft 45 to the third gear 53 meshed with the first gear member 41 of the output gear 35 for driving the output gear at a rotational rate which is greater than that of the input shaft 27. For example and not by way of limitation, if the ratio of teeth of the larger diameter gear 39 to that of the first idler gear 49 is 31T/7T and the ratio of teeth on the second idler gear 53 to the first output gear member 41 is 13T/25T, the output shaft rotates 2.3 times faster than the input shaft. The ratio of the turns of the crank handle 16 (see FIG. 1) per inch of travel of the lower leg section 13 for this version is 1.97. In this way, the lower leg section 13 can be more rapidly extended from the upper leg section 15 for bringing the leg into contact with the pavement S.

Once the leg 11 contacts the pavement, it will be necessary to increase the mechanical advantage provided by the gearing to lift the semitrailer 12 (FIG. 1) off of the fifth wheel of the tractor (not shown). To do this, the driver moves the input shaft 27 axially inwardly so that the pinion gear 37 moves out of the central opening 42 of the large diameter input gear 39 and into engagement with the teeth of the second idler gear 51 (as shown in FIG. 11). The large diameter input gear 39, although still meshed with the first gear 49 of the idler shaft 45 does not transmit any torque from the input shaft 27 and does not rotate conjointly with the input shaft. The second set of teeth 40 on the left side of the pinion gear 37 mesh with the teeth of the second idler gear 51. It will be readily apparent that rotation Of the input shaft 27 will be substantially reduced by the second idler gear 51, producing an accompanying increase in torque. The higher torque is transmitted by the third idler gear 53 to the first gear member 41 of the output gear 35, achieving a further (or "double") reduction. Now rotation of the input shaft 27 produces extension of the lower leg section 13 at a slower rate, but with greater lift to raise the semitrailer 12 and its load.

Figure 16:
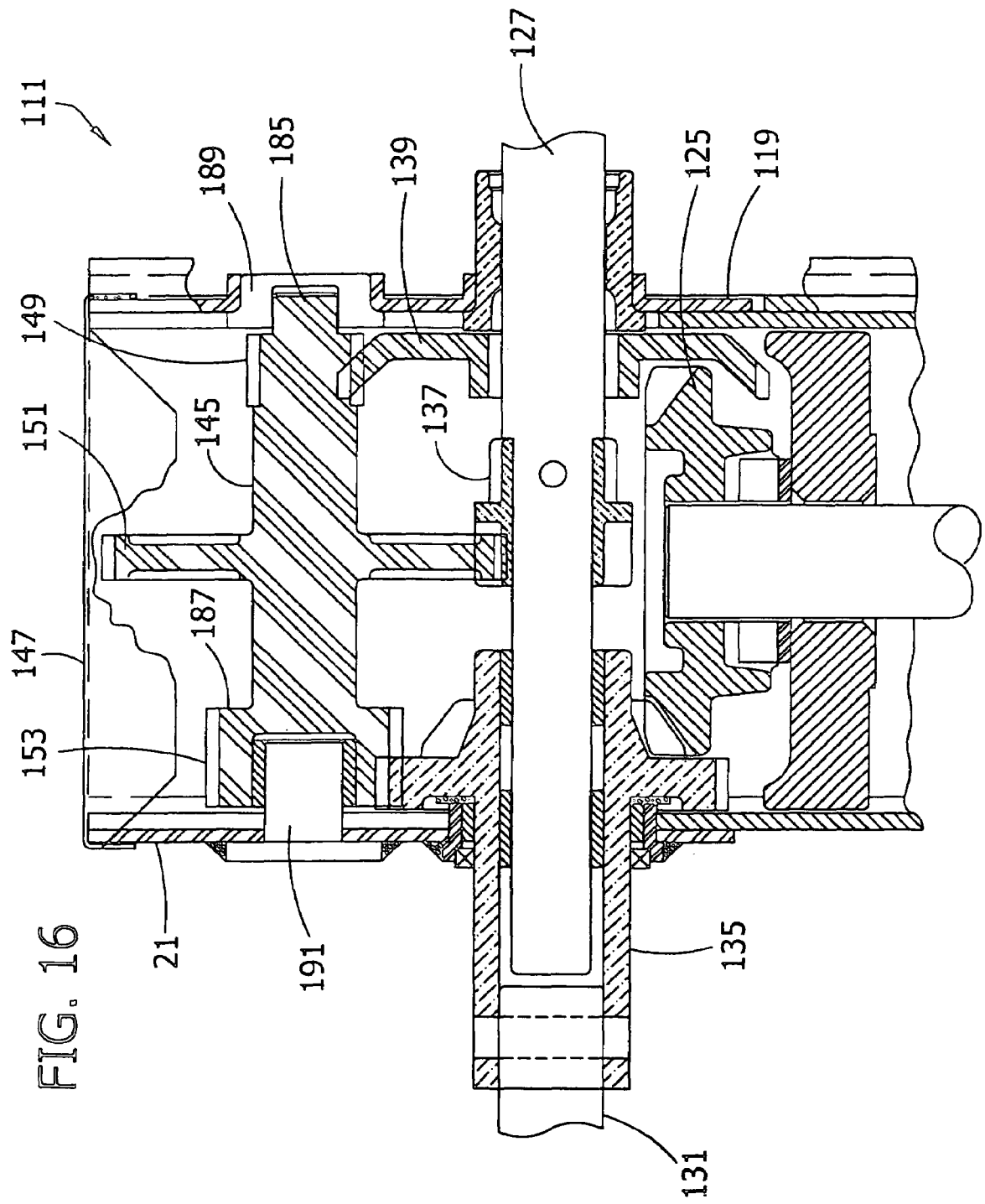
FIG. 16 is a schematic, fragmentary cross section of another version of the single idler landing gear leg having an idler shaft supported from the side internally of the leg.

FIG. 16 illustrates another version of the single idler landing gear leg 111, where corresponding parts are indicated by the same reference numeral, but with the prefix "1". An idler shaft 145 is supported by bushings associated with outside and inside cover plates 119, 121 rather than being supported by the top cover. In this embodiment, the top cover 147 is not used to support the idler shaft 145. Otherwise, the construction is substantially identical to FIG. 9 and will not be further described herein. Referring again to FIG. 16, it may be seen that the idler shaft 145 has a reduced diameter stub 185 at the right end thereof and an enlarged diameter portion 187 at its left end. The stub 185 is journaled in a bushing 189 which is fitted into an opening formed in the outside cover plate 121 for rotation of the idler shaft 145. The bushing 189 blocks the opening to assist in sealing the leg 11. A short axle 191 is received through an opening in the inside cover plate 121 and into a recess in the enlarged diameter portion 187 of the idler shaft to mount the idler shaft 145 for rotation. The axle 191 is sealably secured to the inside cover plate 121, such as by welding. The fitted bushing 189 and the short axle 191 mount the idler shaft 145 for rotation between the outside and inside cover plates 119, 121. Thus, there is no moving part extending through the outside and inside cover plates 119, 121. Thus, although the idler shaft 145 is supported from the sides of the leg 11, it does not extend through the sides. Accordingly, a prime site for the leakage of lubricant (through a rotating shaft bearing) is eliminated.

Some examples of possible high gear and low gear ratios for the single idler leg 11 are listed below in turns of the crank handle 16 per inch of travel of the leg.

| Low Gear | 29.2 | Low Gear | 32.8 | Low Gear | 35.1 |
|---|---|---|---|---|---|
| High Gear | 1.8 | High Gear | 1.97 | High Gear | 3.3 |
| Low Gear | 38 | Low Gear | 41.8 | Low Gear | 35.1 |
| High Gear | 1.8 | High Gear | 1.97 | High Gear | 4.5 |
| Low Gear | 35.1 | | | | |
| High Gear | 3.9 | | | | |

Figure 17:
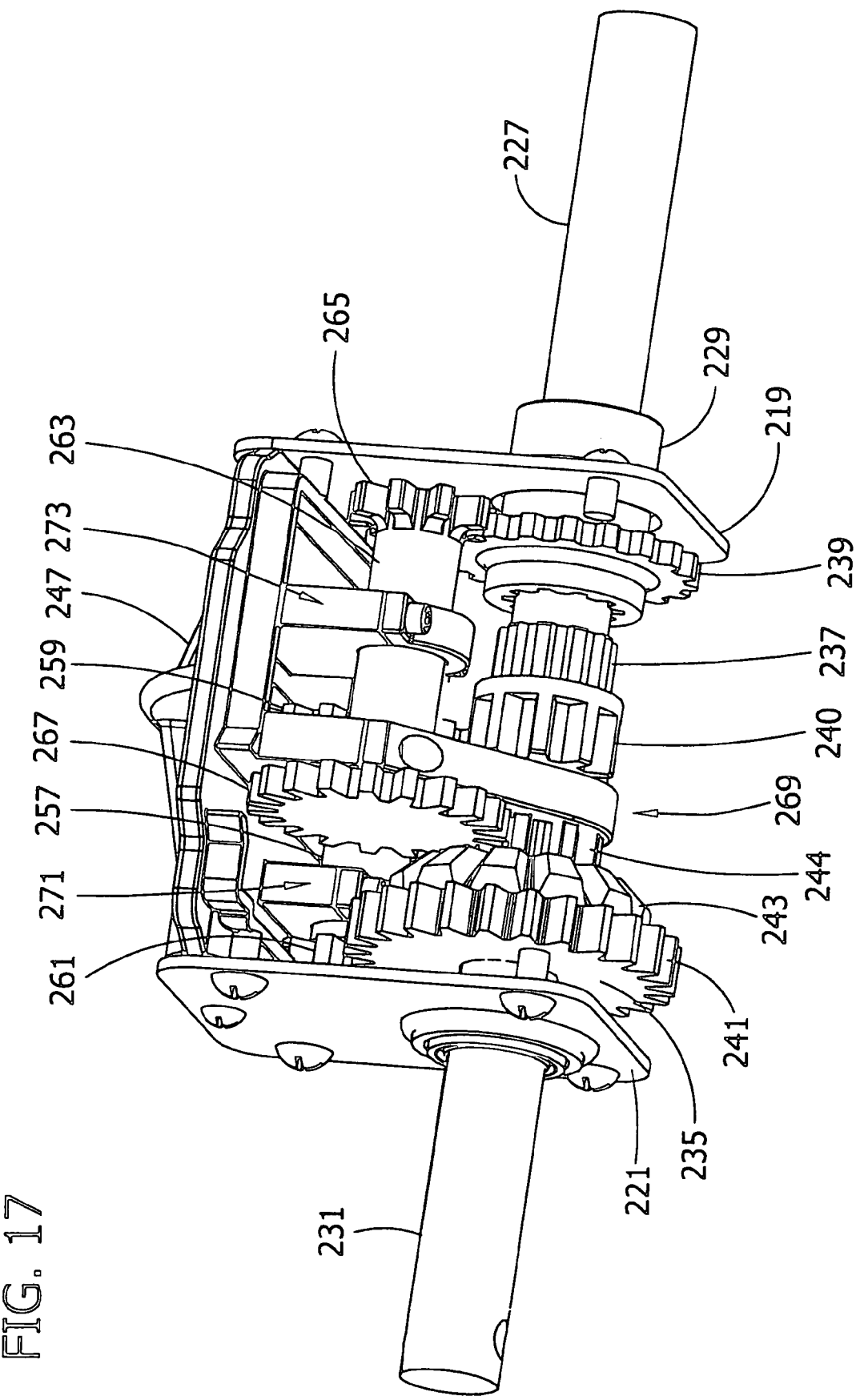
FIG. 17 is a bottom side perspective of a top cover and associated dual idler shafts and gearing according to one embodiment of the invention.
Figure 18:
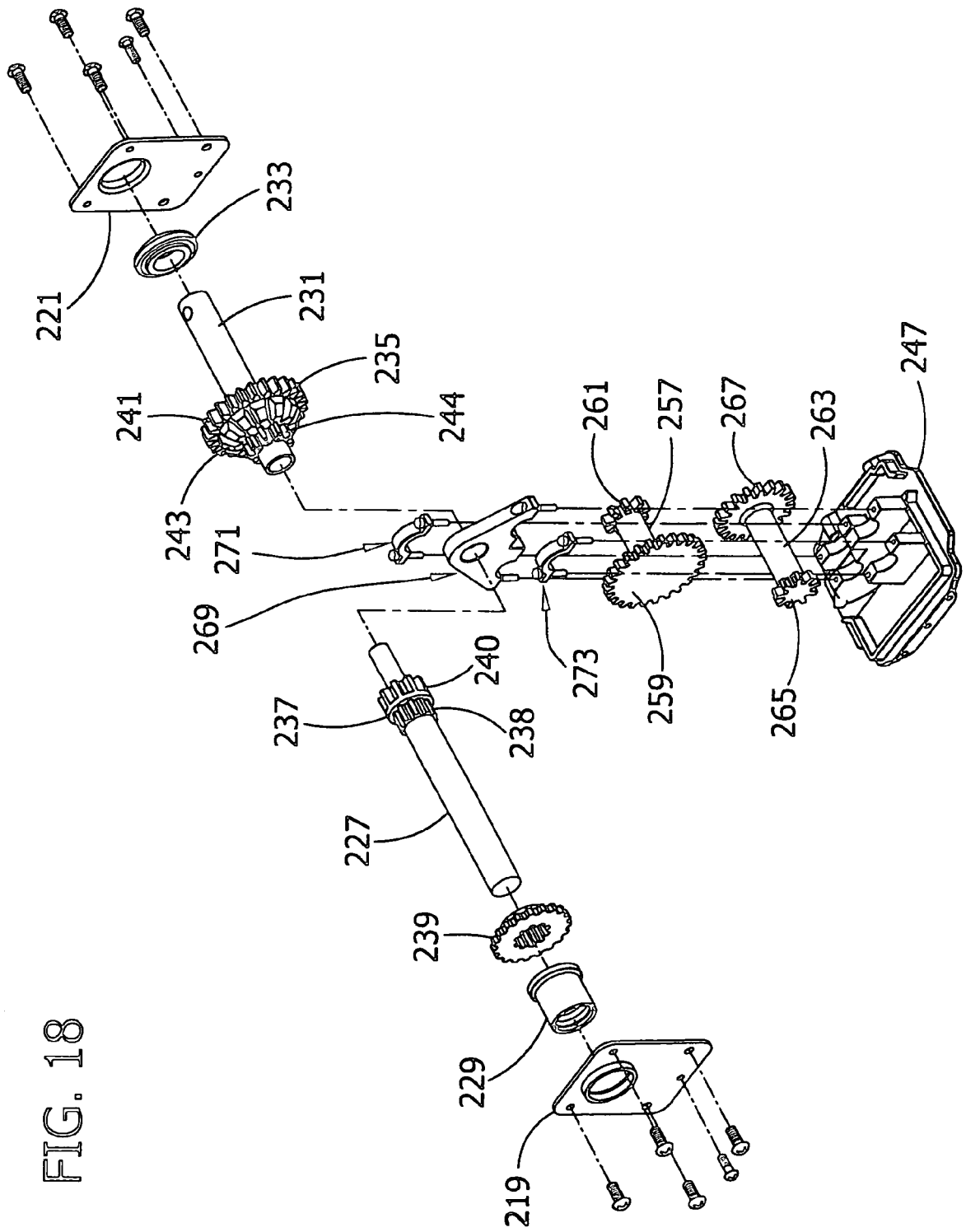
FIG. 18 is an inverted perspective view of the top cover and dual idler shafts of FIG. 17 with the parts exploded to illustrate assembly.

FIGS. 17-25 collectively show a landing gear leg 211 and components thereof, of another embodiment. Corresponding parts are indicated by the same reference numeral as for the landing gear leg 11, but with the prefix "2". FIGS. 17 and 18 illustrate a gearing subassembly 232 and a top cover 247 of the dual idler shaft landing gear leg 211. The subassembly comprises a dedicated low gear idler shaft 257 (FIGS. 22A and 22B) and a separate, dedicated high gear idler shaft 263 (FIGS. 23A and 23B) for mechanically connecting an input shaft 227 with an output shaft 231. The input shaft 227 is received through a bearing 229 in an outside cover plate 219 into the leg 211 and the output shaft 231 is received through a bearing 233 in an inside cover plate 221 of the leg. A top cover 247 is formed to rotatably mount both the low gear idler shaft 257 and the high gear idler shaft 263 in the dual idler landing gear leg 211. Preferably, it is not necessary to have additional openings in the exterior of the leg 211 through which rotating shafts are received, and which are prime locations for leaking lubricant.

Figure 19:
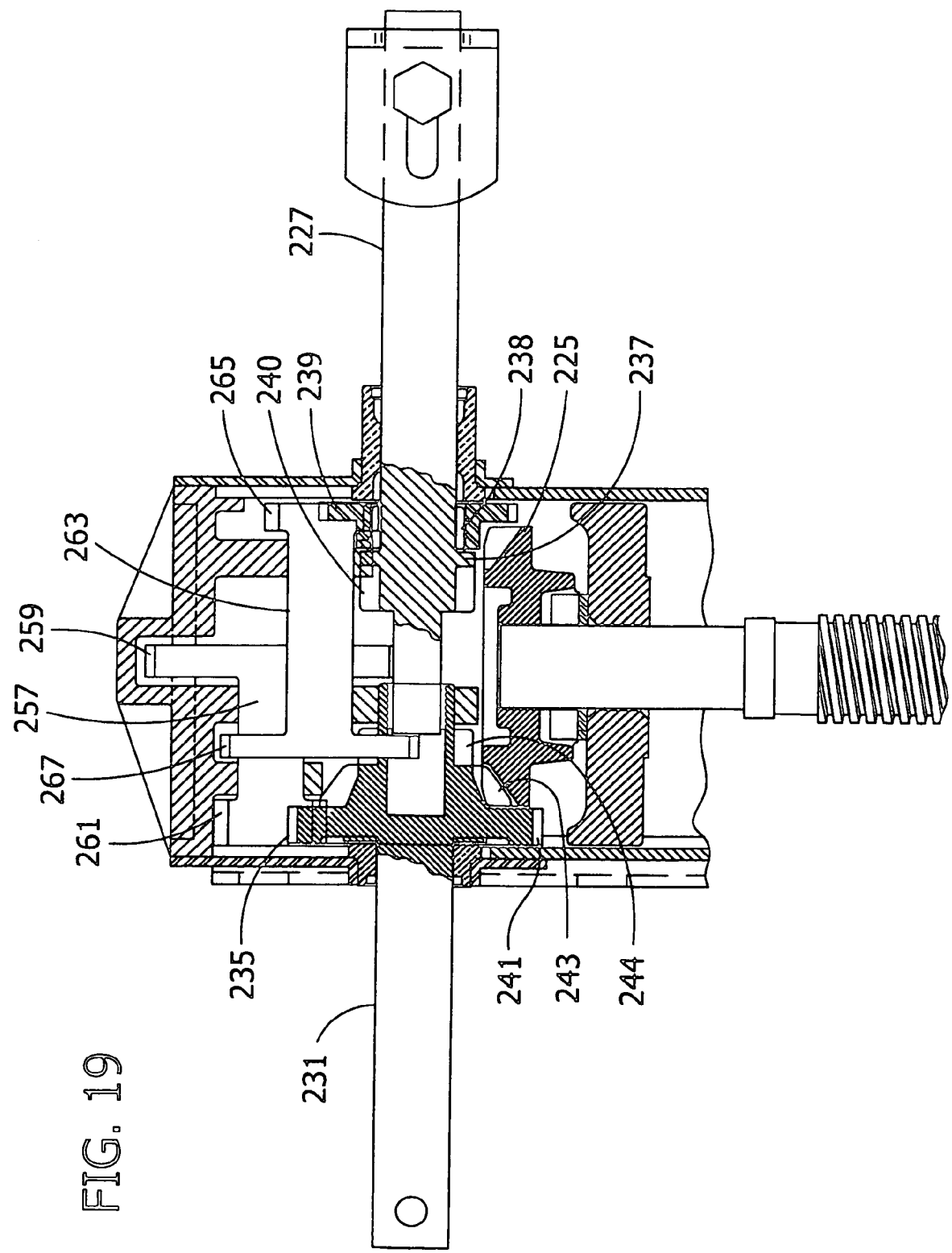
FIG. 19 is a schematic, fragmentary side elevation of a dual idler landing gear leg with a wall of the leg and other selected parts broken away to reveal construction with the input shaft in the high gear position.
Figure 20:
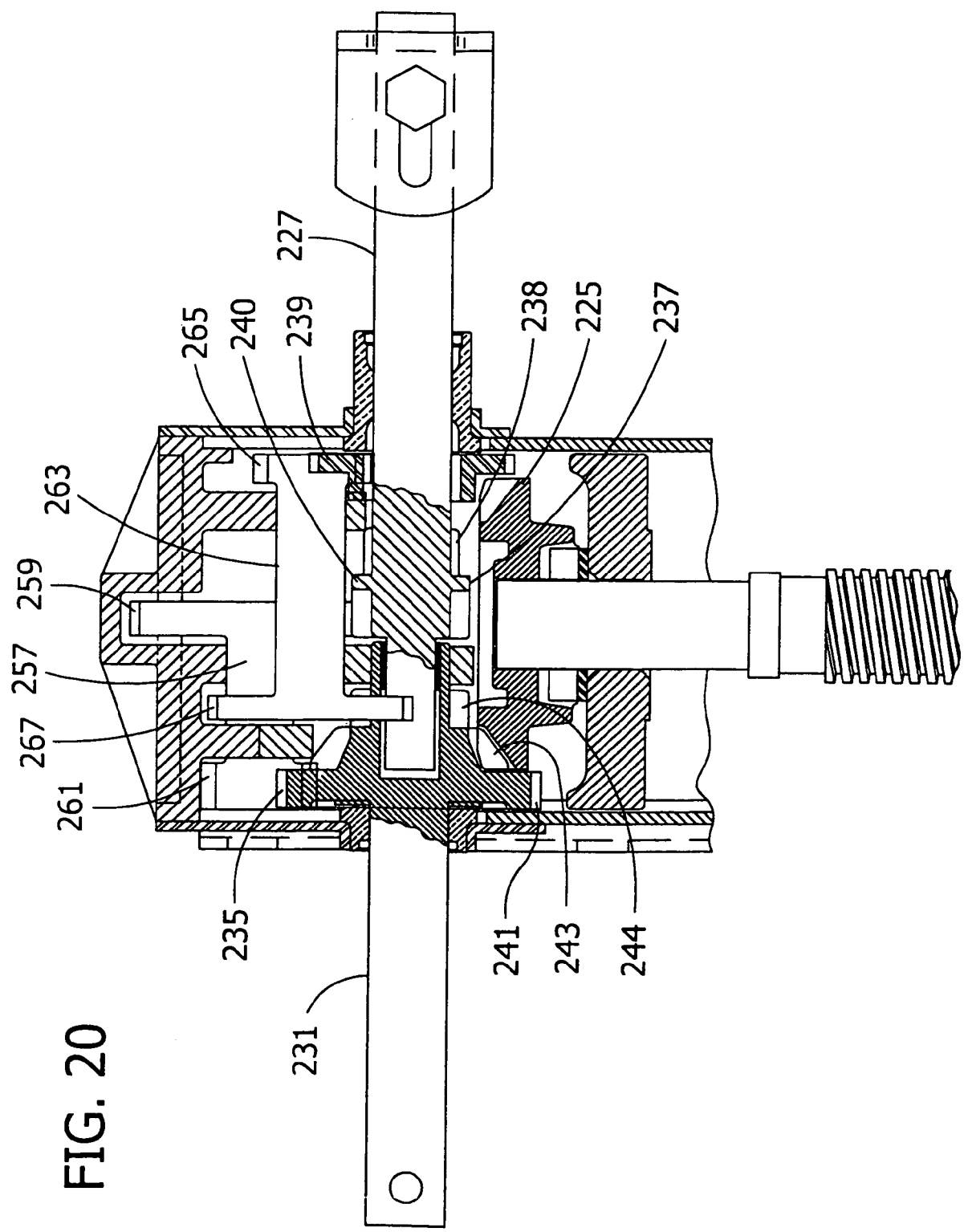
FIG. 20 is a schematic, fragmentary side elevation of a dual idler landing gear leg with a wall of the leg and other selected parts broken away to reveal construction with the input shaft in the low gear position.

FIGS. 19 and 20 illustrates that the input shaft 227 and output shaft 231 are coaxial and a reduced diameter inner end of the input shaft is received and borne within the output shaft. Alternately, an output shaft has a reduced diameter end portion which is received in an axial opening in the input shaft (not shown). The bearing 229 supporting the input shaft 227 in the outside cover plate 219 permits the input shaft to both rotate and move axially relative to the bearing. As to axial movement, a ball and spring mechanism (not shown) is provided to engage the bearing 229 to releasably lock the input shaft 227 in two axial positions, corresponding to high gear and low gear, respectively. The subassembly 232 is shown in the high gear position in FIG. 19 and in the low gear position in FIG. 20.

It is noted that a pinion gear 237 is formed as one piece with the input shaft 227 and an output gear 235 is formed as one piece with the output shaft 231. It will be appreciated that the pinion gear 237 and output gear 235 may be formed separately from their respective shafts (227, 231). The pinion gear 237 contains a first set of teeth 238 and a second set of teeth 240. A large diameter input gear 239 is somewhat smaller than the large diameter gear 39 of the first embodiment and is entirely planar, but is similarly mounted for free rotation on the input shaft 227 except when engaged by the first set of teeth 238 of the pinion gear 237. The output gear 235 differs from the single idler output gear configuration by having a third, small diameter gear member 244. More specifically, the dual idler landing gear leg includes a low gear idler shaft 257 including a large diameter first gear 259 engageable by the pinion gear 237 for driving the rotation of the low gear idler shaft, and a second small diameter gear 261 permanently meshed with the first gear member 241 of the output gear 235. A separate high gear idler shaft 263 includes a first high gear idler gear 265 permanently meshed with the large diameter input gear 239, and a second high gear idler gear 267 permanently meshed with the third gear member 244 of the output gear 235. Accordingly, it is not necessary to balance speed in high gear against torque in low gear. The separate, dedicated idler shafts 257, 263 decouple these design features.

Figure 21:
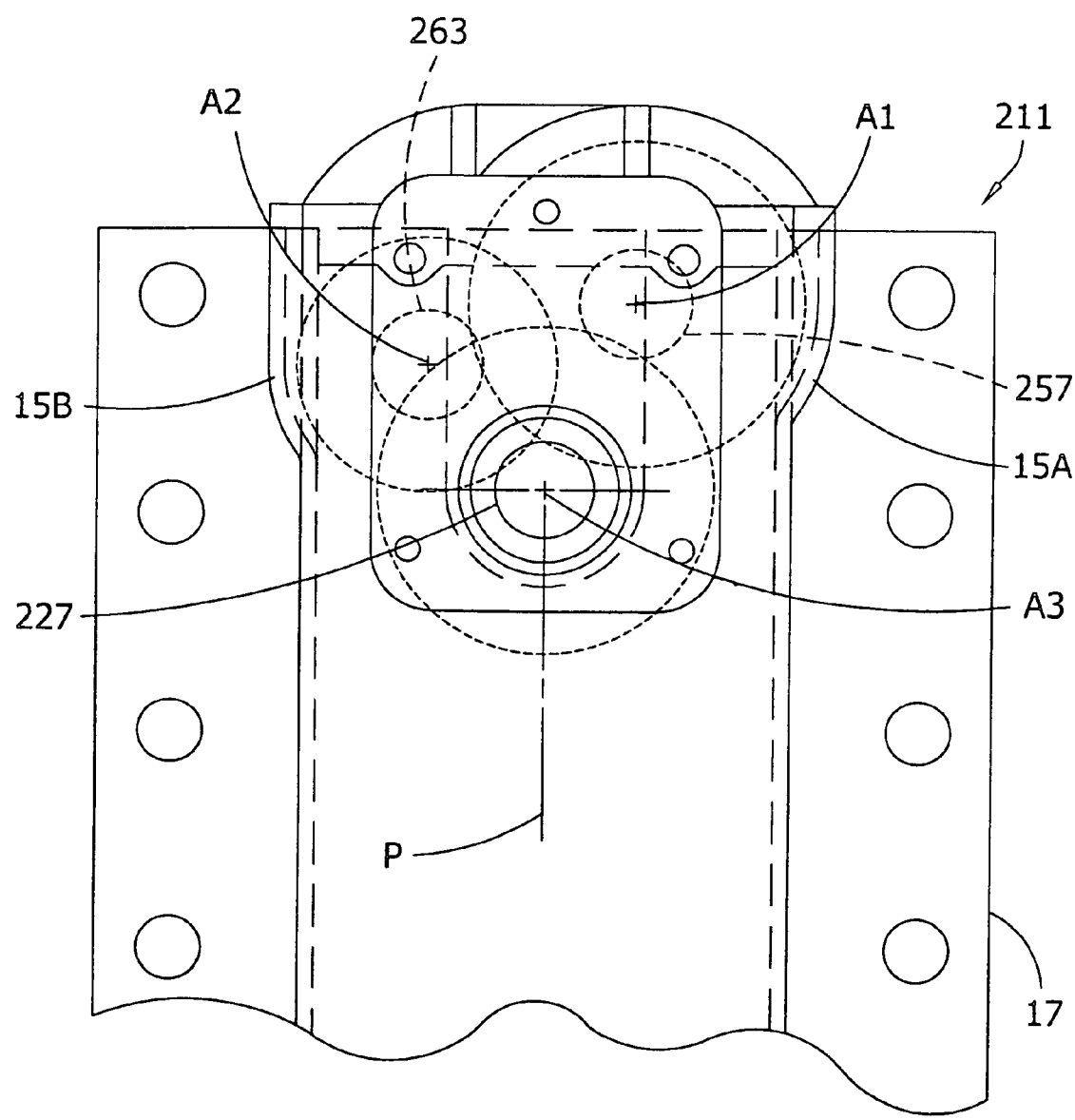
FIG. 21 is an enlarged fragmentary side elevation of the dual idler landing gear.
Figure 22B:
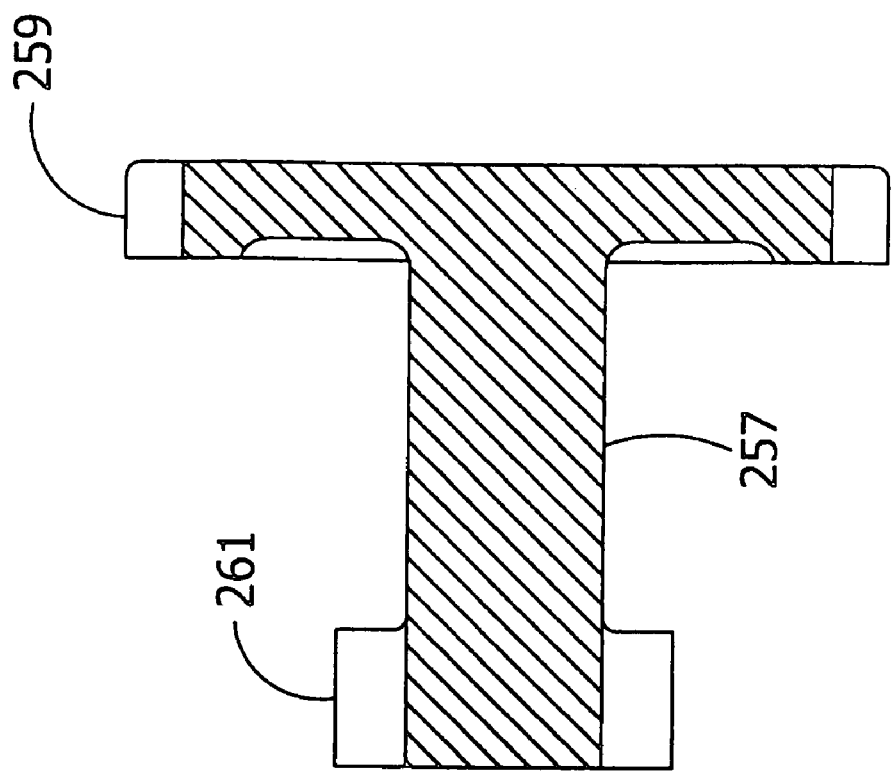
FIG. 22B is a sectional view of the low idler shaft taken along line 22B-22B of FIG. 22A.
Figure 22A:
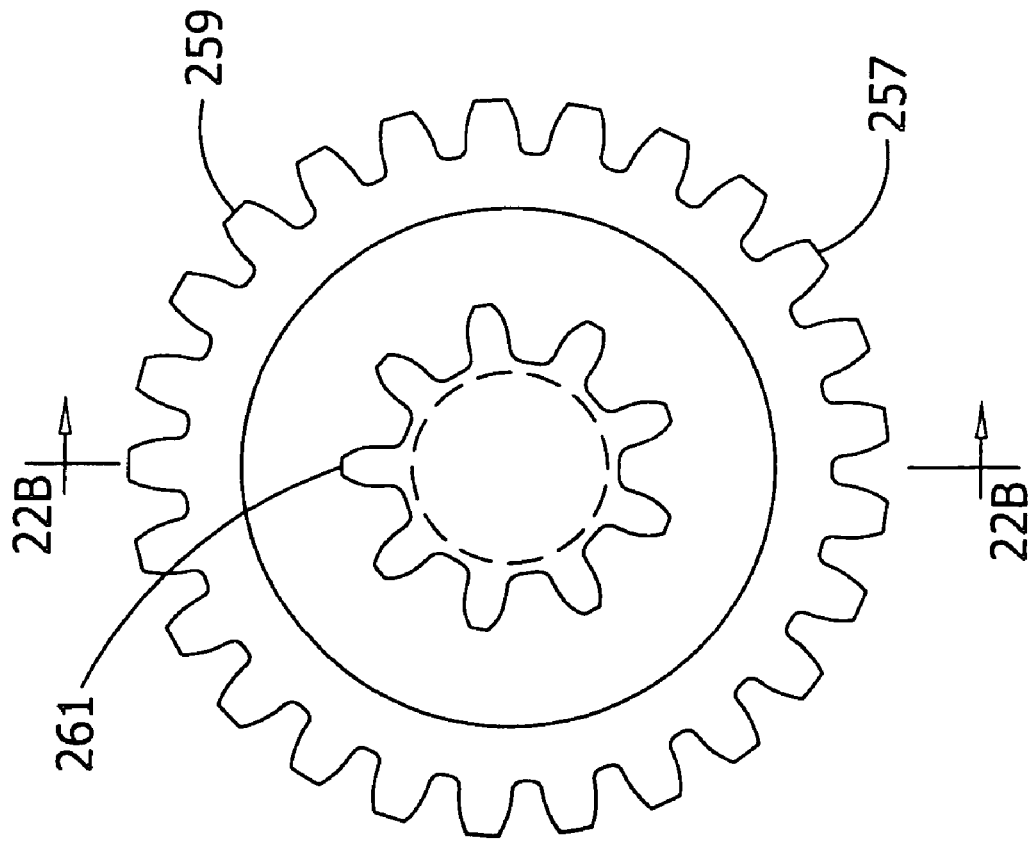
FIG. 22A is an end view of the low idler shaft of the dual idler landing gear.
Figure 23B:
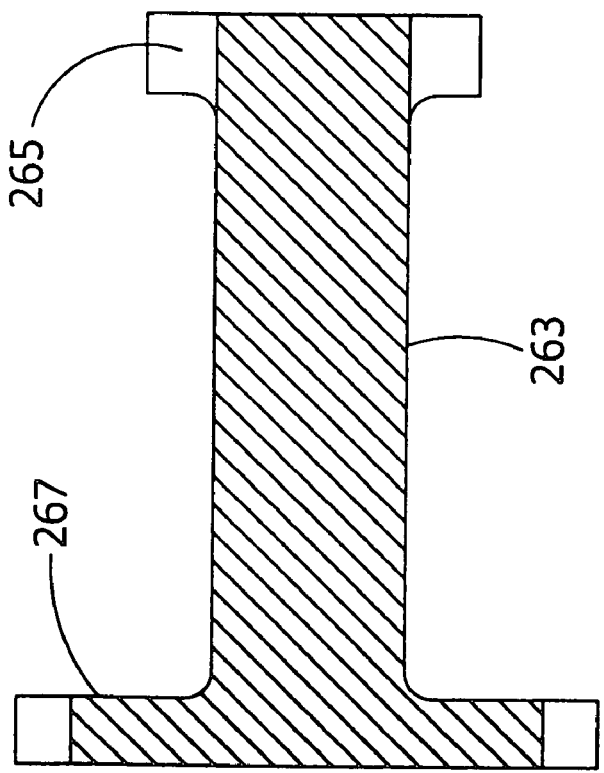
FIG. 23B is a sectional view of the high idler shaft taken along line 23B-23B of FIG. 23A.
Figure 23A:
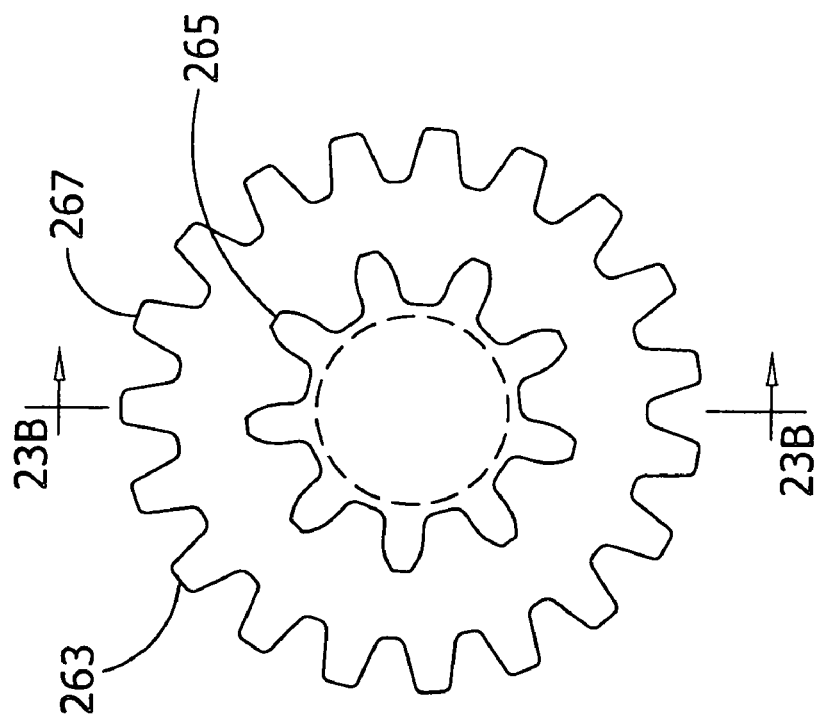
FIG. 23A is an end view of the high idler shaft of the dual idler landing gear.

As shown in FIG. 21, the axis A1 of the low gear idler shaft 257 and the axis A2 of the high gear idler shaft 263 are offset on opposite sides of a vertical plane P including the common axis of rotation A3 of the input and output shafts 227, 231. Preferably, the offset is as small as necessary to permit the gears of both idler shafts 257, 263 to mesh with the coaxially arranged gears (235, 237, 239) of the input and output shafts 227, 231.

The operation of the dual idler landing gear leg 211 is similar to the operation of the embodiment of the single idler landing gear 11 shown in FIG. 5, except that different idler shafts 257,263 are used for low and high gear. In high gear, the first set of teeth 238 of the pinion gear 237 is partially received in the large diameter input gear 239 so that the large diameter gear rotates conjointly with the input shaft 227 (FIG. 19). It will be appreciated that the high gear idler shaft 263 rotates faster than the input shaft 227. For example, with 19 teeth on the large diameter input gear 239 and 9 teeth on the high gear idler gear 265, the idler shaft 263 rotates 2.11 times as fast as the input shaft 227. The rotational speed is again increased by the second high gear idler gear 267 meshed with the third gear member 244 of the output gear. The low gear idler shaft 257 turns but does not transfer any torque in this configuration. For low speed, high torque operation the input shaft 227 is moved axially to the left so that the large diameter input gear 239 is disengaged and the second set of teeth 240 on the other end of the pinion gear 237 mesh with the first low gear idler gear 259 (FIG. 20). The input shaft torque is now transferred by the low gear idler shaft 257 to the output gear by way of the second low gear idler gear 261 and the first gear member 241 of the output gear 235. A substantial reduction is achieved both from the input shaft 227 to the low gear idler shaft 257 and from the low gear idler shaft to the output gear 235 by virtue of the relative sides of the meshed gears.

Preferably, the numerical values given in the range have units of turns of the crank per inch of travel of the leg are between 1.02 and 4.5 in high gear and 26 and 44 in low gear. However, one skilled in the art will understand that any combination of low and high ratios is possible. Preferably, the dual idler leg 211 provides good lift in low gear (e.g., 35 turns per inch), and an option for high gear. For example, the high gear could be either 1.02 or 4.5, with minimal change of gears and other components necessary to provide the desired high gear ratio.

Figure 24:
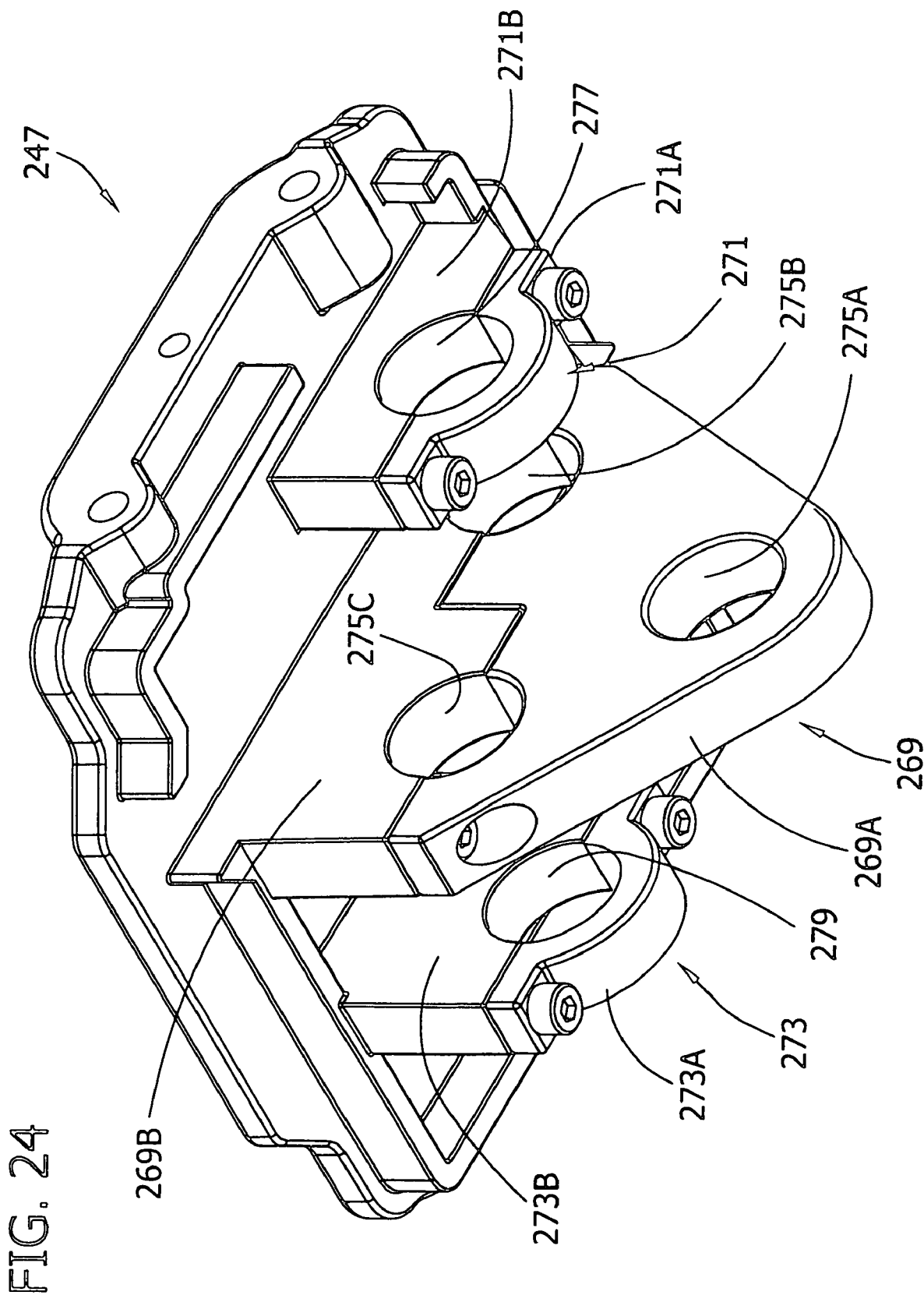
FIG. 24 is a bottom side perspective of the top cover of the dual idler landing gear leg.
Figure 25:
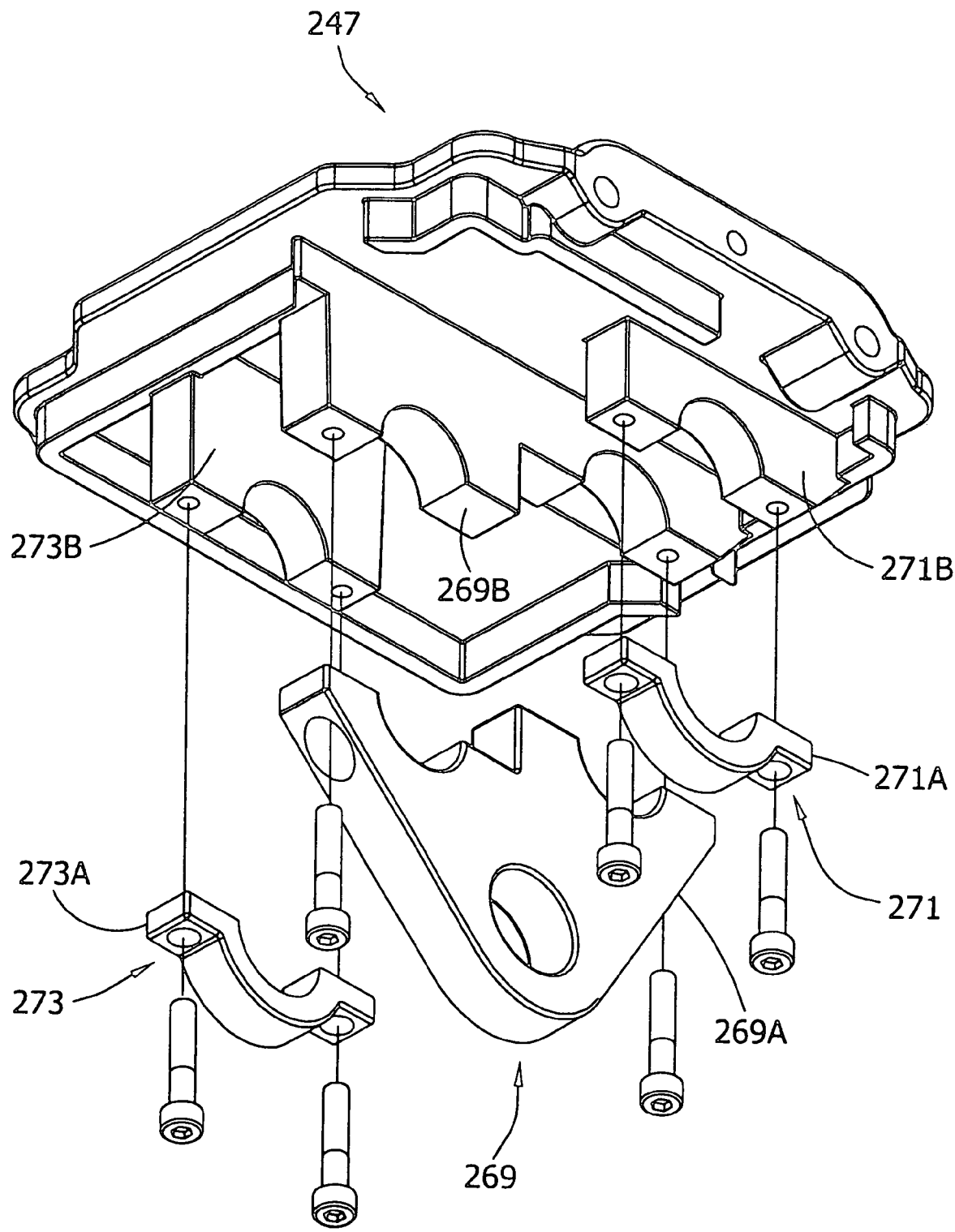
FIG. 25 is an exploded perspective of the top cover of FIG. 24.

As set forth above with respect to the single idler embodiment, the top cover 247 is preferably made of a polymeric material such as nylon. However, it may be made of other suitable materials, such as a ductile iron casting or aluminum casting, without departing from the scope of the present invention. It is believed no separate bearings will be necessary if the top cover 247 is made of nylon or a like material. The input and output shafts 227, 231 are also supported by the top cover 247 in a first yoke 269 depending from the top cover. A second yoke 271 is provided for supporting one end of the low gear idler shaft 257 and a third yoke 273 is provided to support one end of the high gear idler shaft 263. FIGS. 24 and 25 illustrate the top cover 247 of the double idler landing gear leg 211 which mounts the idler shafts 257, 263 for rotation. It may be seen that each yoke 269, 271, 273 (broadly, "bearing member") includes a respective removable lower portion 269A, 271A, 273A which is attached to an upper portion 269B, 271B, 273B by a respective pair of bolts. It is also envisioned that the top cover 247 and yokes 269, 271, 273 may be made as a single, unitary piece. In that event, the idler shafts 257, 263 would be made in two pieces (not shown) to permit their insertion into holes in the yokes 269, 271, 273. After insertion the two pieces of the idler shaft would be connected together. In the illustrated embodiments, the first yoke 269 has three holes, including a first hole 275A which receives the output shaft 231, a second hole 275B which receives the low gear idler shaft 257 and a third hole 275C which receives the high gear idler shaft 263. The second yoke 271 has a single hole 277 for another portion of the low gear idler shaft 257 and the third yoke 273 similarly has a single hole 279 for receiving another portion of the high gear idler shaft 263. The output shaft 231 is received in the first hole 275A of the first yoke 269 and is supportingly engaged by the first yoke.

To place the idler shafts 257, 263 in the first, second and third yokes (269, 271, 273), the lower portions (269A, 271A, 273A) of the yokes are removed, opening up the second and third holes 275B, 275C of the first yoke and the holes 277, 279 of the second and third yokes. The low gear idler shaft 257 is placed on the top cover 247 (which is preferably inverted for assembly) so that a section of the shaft adjacent to the first low gear idler gear 259 is received in the exposed portion of the second hole 275B of the upper portion 269B of the first yoke 269 still associated with the top cover. At the same time, a section of the low gear idler shaft 257 nearer the second low gear idler gear 261 is received in the portion of the hole 277 in the upper portion 271A of the second yoke 271 which is still associated with the top cover 247. Similarly, the high gear idler shaft 263 is placed so that a section of the shaft adjacent to the first high gear idler gear 265 is received in the exposed portion of the hole 279 of the upper portion of the third yoke 273 still associated with the top cover 247. At the same time, a section of the high gear idler shaft 263 nearer the second high gear idler gear 267 is received in the exposed portion of the third hole 275C in the upper portion 269B of the first yoke 269.

The idler shafts 257, 263 are secured in place by bolting the lower portions 269A, 271A, 273A to the respective upper portions 269B, 271B, 273B, thereby encircling the idler shaft sections. In this way, the idler shafts 257, 263 are mounted entirely by the top cover 247. The outside cover plate 219 may be preassembled with the input shaft 227 and the inside cover plate 221 may likewise be preassembled with the output shaft 231. The input and output shafts (and associated cover plates) can be brought together with the top cover 247 as shown in FIG. 18. The output shaft 231 is received through the first hole 275A in the first yoke 269 and the reduced diameter portion of the input shaft 227 is inserted into the output shaft. Bolts are passed through the cover plates 219, 221 and into the top cover 247. This completes the subassembly 232 which includes all of the gearing of the landing gear leg 211 except for the bevel gear 225 attached to the top of the lead screw (not shown but essentially the same as the screw 23 of FIG. 5). It is further contemplated that the single idler leg 11 may use a top cover substantially similar to the top cover 247 used by the dual idler leg 211 and leave one of the yokes 271, 273 unused, as described below. The subassembly 232 so formed may be dropped into the open top of the leg 211 in manufacture. The cover plates 219, 221 are secured to the leg 211 to assemble the subassembly 232 with the upper section 215 of the leg.

Figure 26:
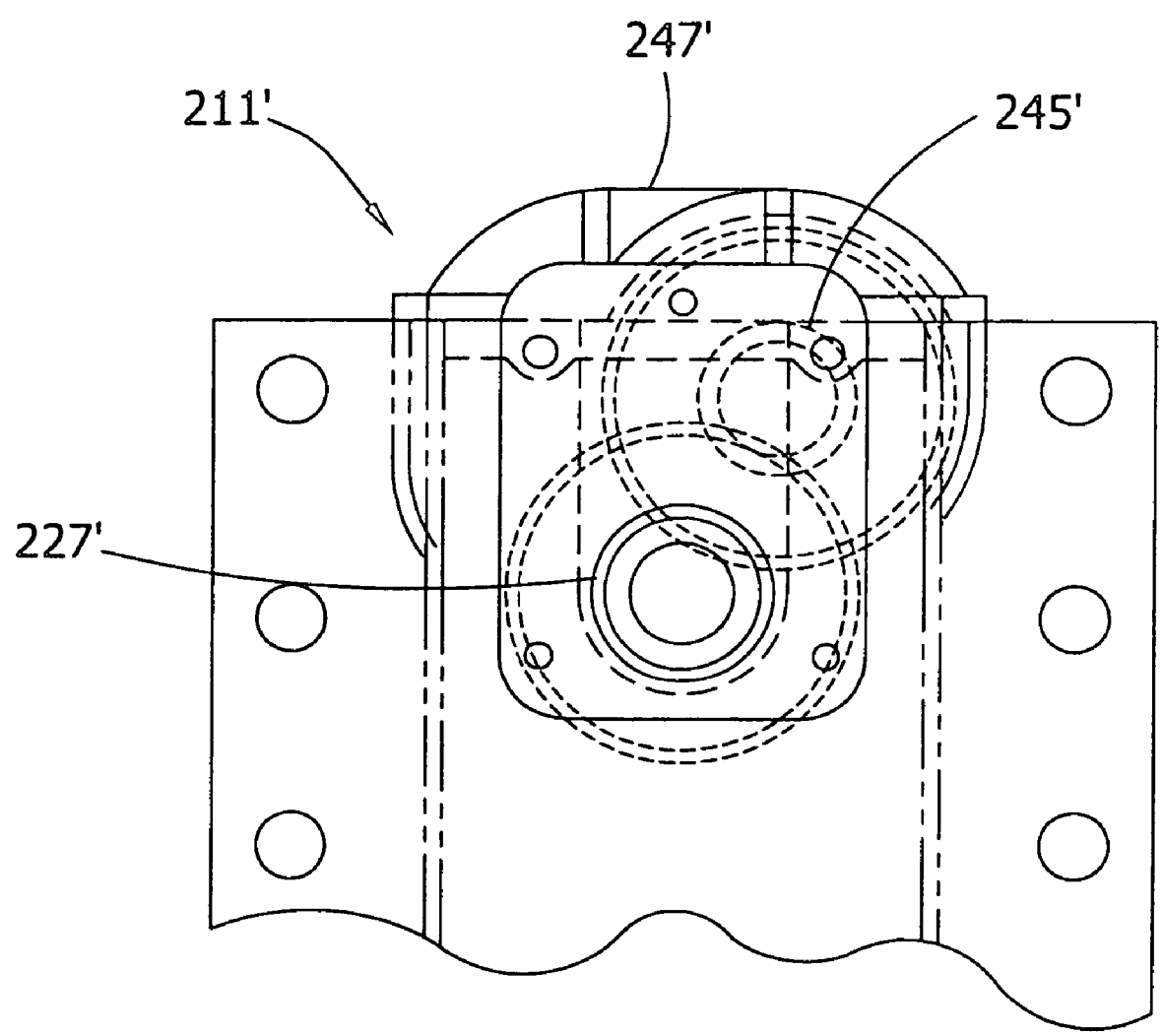
FIG. 26 is a fragmentary front elevation of a single idler landing gear leg having components substantially identical to the dual idler landing gear leg of FIGS. 20 and 21.
Figure 27:
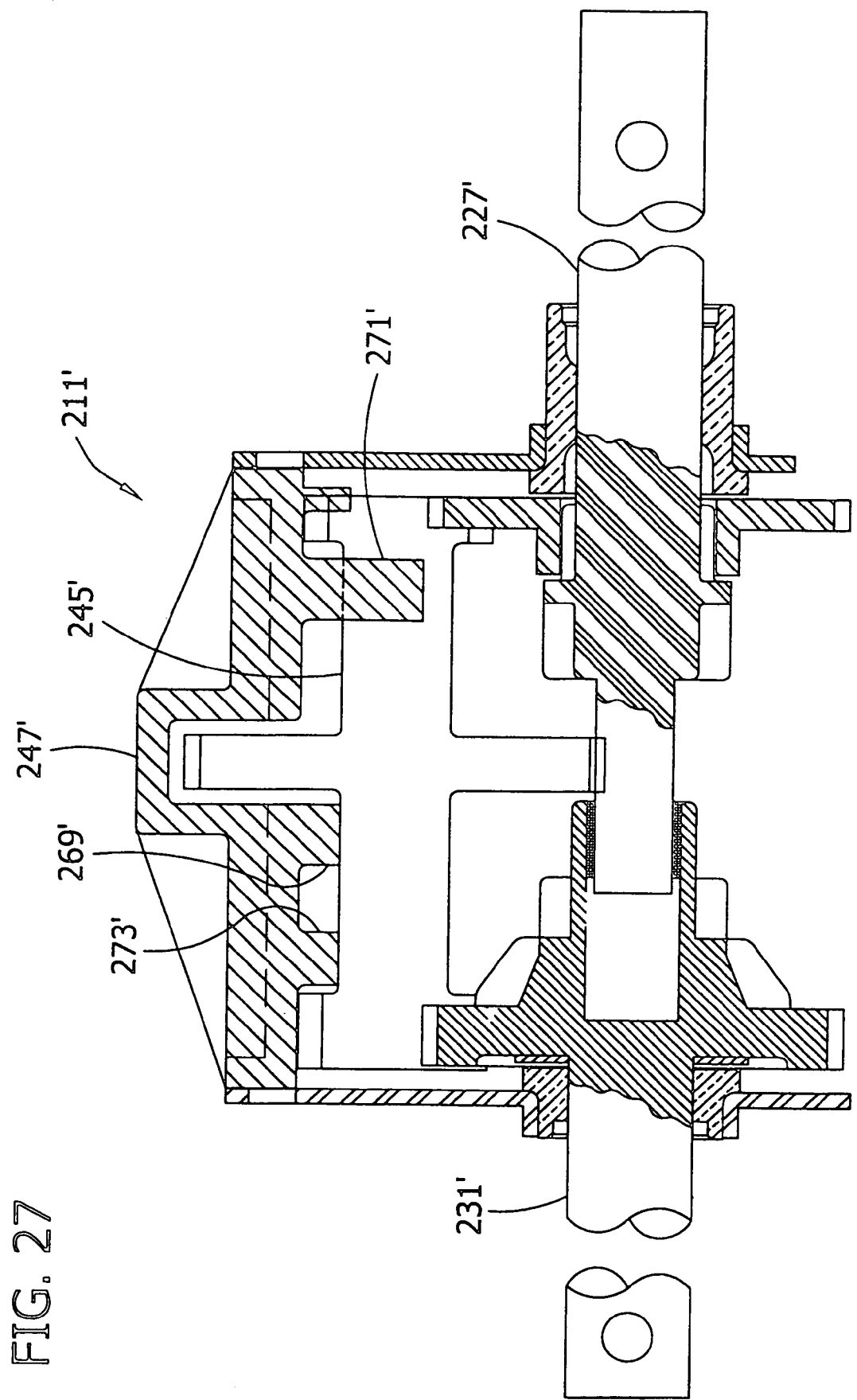
FIG. 27 is a fragmentary side elevation of the single idler landing gear leg with a wall of the leg and other selected parts broken away to reveal construction.

FIGS. 26 and 27 illustrate another version of the single idler landing gear leg 211' that uses a top cover 247' having yokes 269', 271' and 273' substantially identical to the top cover described above with respect to the dual idler landing gear leg 211. Thus, the same top cover and leg sections can be used to manufacture both single and dual idler landing gear legs. In the version illustrated in FIGS. 27 and 28, the input and output shafts 227', 231' are also supported by the top cover 247' in the first yoke 269' depending from the top cover. Either the second yoke 271' or the third yoke 273' receives and supports the idler shaft 245'. The other yoke 273' or 271' is not used by the subassembly 232'. The operation of this version would be substantially similar to the operation of the single idler leg 11 described above. With this version, both a single idler subassembly 232' and the dual idler subassembly 232 would use a common top cover to facilitate manufacture.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

The invention claimed is:

1. Landing gear for selectively supporting a semitrailer, the landing gear comprising:
   a leg having an upper section and a lower section in telescoping arrangement with each other;
   a lead screw mounted for extending and retracting the upper and lower sections relative to each other upon rotation of the lead screw;
   an input shaft for applying a torque to the lead screw to drive rotation thereof, the input shaft being rotatable about a first rotation axis and movable in translation along the first rotation axis for shifting between a first position for low gear operation and a second position for high gear operation;
   an output shaft including an output gear for transmitting torque to the lead screw, the output shaft being mounted for rotation about a second rotation axis and being generally axially aligned with the input shaft; and
   a gearing subassembly configured so that for each rotation of the input shaft, the output shaft rotates less than one rotation for low gear operation and interconnecting the generally axially aligned input and output shafts in the second position so that for each rotation of the input shaft, the output shaft rotates more than one rotation whereby the gearing subassembly augments lift when the input shaft is in the first position and augments speed in the second position, wherein the gearing subassembly comprises at least two gears mounted for rotation about axes spaced from the axis of rotation of the input and output shafts, a first of the two gears being in driving engagement with the input shaft in the first position thereof, and a second of the two gears being in driving engagement with the input shaft in the second position thereof, the first gear has a larger diameter than the second gear, and wherein the gearing subassembly further comprises a fourth gear engaged with the output shaft, and wherein the gearing subassembly comprises first and second idler shafts, the first and third gears being mounted on the first idler shaft and the second and fourth idler gears being mounted on the second idler shaft.

2. Landing gear as set forth in claim 1 wherein the axes of rotation of the first and second gears are non-coincident.

3. Landing gear as set forth in claim 1 wherein the output gear includes a first gear portion meshed with the third gear and a second gear portion meshed with the fourth gear.

4. Landing gear as set forth in claim 3 wherein the first gear portion of the output gear has a larger diameter than the second gear portion.

5. Landing gear as set forth in claim 1 wherein the gearing subassembly is located substantially within the upper section of the leg.

6. Landing gear as set forth in claim 1 wherein the upper section comprises opposing walls, each wall having a slot therein and the input shaft extends into the upper section of the leg through one of said slots.

7. Landing gear for selectively supporting a semitrailer, the landing gear comprising:
   a leg having an upper section and a lower section in telescoping arrangement with each other,
   a lead screw mounted for extending and retracting the upper and lower sections relative to each other upon rotation of the lead screw;
   an input shaft rotatable about a first rotation axis;
   an output shaft rotatable about a second rotation axis and connected for driving rotation of the lead screw;
   an idler shaft rotatable about a third rotation axis
   gearing associated with the input shaft, output shaft, idler shaft and lead screw for operatively connecting input shaft to the lead screw for driving rotation thereof;
   a bearing member located within the upper section of the leg and including a bearing element bearing the idler shaft for rotation, the bearing member being supported by the upper section at a location above the location of the bearing element.

8. Landing gear for selectively supporting a semitrailer, the landing gear comprising:
   a leg having an upper section and a lower section in telescoping arrangement with each other,
   a lead screw mounted for extending and retracting the upper and lower sections relative to each other upon rotation of the lead screw;
   an input shaft rotatable about a first rotation axis and movable in translation along the first rotation axis for shifting between a first position for low gear operation and a second position for high gear operation;
   an output shaft mounted for rotation about a second rotation axis;
   a first idler shaft mounted for rotation about a first idler shaft axis spaced from the axis of rotation of the input shaft;
   a second idler shaft mounted for rotation about a second idler shaft axis spaced from the axis of rotation of the input shaft;
   the input shaft and the first idler shaft being arranged such that in the first position torque from the input shaft is transmitted through the first idler shaft to the lead screw and the output shaft; and
   the input shaft and the second idler shaft being arranged such that in the second position torque from the input shaft is transmitted through the second idler shaft to the output shaft and lead screw.

9. Landing gear as set forth in claim 8 wherein the first idler shaft has a first gear disposed for driving engagement with the input shaft in the first position thereof and the second idler shaft has a second gear disposed for driving engagement with the input shaft in the second position thereof.

10. Landing gear as set forth in claim 9 wherein the first idler shaft has a third gear engaged with the output shaft and the second idler shaft has a fourth gear engaged with the output shaft.

11. Landing gear as set forth in claim 10 wherein the output shaft includes an output gear rotatable with the output shaft.

12. Landing gear as set forth in claim 11 wherein the output gear includes a first gear portion meshed with the third gear and a second gear portion meshed with the fourth gear.

13. Landing gear as set forth in claim 12 wherein the first gear portion of the output gear has a larger diameter than the second gear portion.

14. Landing gear as set forth in claim 8 further comprising a top cover received in an open upper end of the upper section of the leg and closing the open upper end, and a bearing member mounting the first and second idler shafts, the bearing member being supported by the top cover.

15. Landing gear as set forth in claim 14 wherein the top cover and bearing member are at least partially formed as one piece.

16. Landing gear as set forth in claim 15 wherein the top cover and bearing member are made of polymeric material.

17. Landing gear as set forth in claim 14 wherein the bearing member mounts the input and output shafts.

18. Landing gear as set forth in claim 17 wherein the bearing member comprises a first bearing member and cover plates depending from the top cover generally on opposite sides of the leg, each cover plate having a bearing therein for rotatably mounting a respective one of the input and output shafts on the cover plate.

19. Landing gear as set forth in claim 18 wherein the upper section of the leg has slots therein covered by the cover plates, the input and output shafts extending through respective ones of the slots.

20. Landing gear for selectively supporting a semitrailer, the landing gear comprising:
a leg having an upper section and a lower section in telescoping arrangement with each other, the upper section having opposing walls;
a first of the walls having a slot therein at an upper end of the first wall;
a lead screw mounted for extending and retracting the upper and lower sections relative to each other upon rotation of the lead screw;
an input shaft rotatable about a first rotation axis and connected in operation to the lead screw for driving rotation thereof, the input shaft extending into the upper section of the leg through the slot in the first wall;
a cover plate attached to the upper section generally over the slot, the cover plate including a bearing receiving the input shaft there through.

21. Landing gear as set forth in claim 20 further comprising an output shaft rotatable about a second axis of rotation and an output gear mounted on the output shaft, the output shaft extending into the upper section through a slot in a second of the walls.

22. A subassembly for use in manufacturing a landing gear leg, the subassembly comprising a bearing member adapted to be mounted on the leg in an open top thereof, a shaft mounted on the bearing member for rotation, and gearing associated with the shaft for use in transmitting rotation, whereby the shaft and gearing are supported for rotation independently of mounting in the leg;
wherein the shaft constitutes a first idler shaft, the subassembly further comrprising a second shaft mounted on the bearing member for rotation; and
wherein the second shaft constitutes a second idler shaft, the subassembly further comprising an input shaft and an output shaft mounted on the bearing member for rotation.

23. A subassembly as set forth in claim 22 wherein the bearing member comprises a top cover, an outside cover plate attached to the top cover and an inside cover plate attached to the top cover.

24. A landing gear assembly for selectively supporting a semitrailer, the landing gear assembly comprising:
a leg having an upper section and a lower section in telescoping arrangement with each other;
a lead screw mounted for extending and retracting the upper and lower sections relative to each other upon rotation of the lead screw; and
a subassembly coupled to an end of the upper section of the leg and comprising a first bearing member and an input shaft, wherein the input shaft is mounted within the first bearing member and is operably coupled to the lead screw for driving rotation of the lead screw, and wherein the shaft and first bearing are supported for rotation independently of mounting on the leg.

25. The landing gear assembly of claim 24, wherein the gear subassembly is mounted within an end of the upper section of the leg.

26. The landing gear assembly of claim 24, wherein the subassembly coupled to an end of the upper section of the let by a plurality of bolts.

27. The landing gear assembly of claim 24, wherein the subassembly further comprises a first idler shaft.

28. The landing gear assembly of claim 27, wherein the subassembly further comprises a second idler shaft, an input shaft and an output shaft each supported for rotation independently of mounting on the leg.

29. The landing gear assembly of claim 24, wherein the subassembly includes outer dimensions that are smaller than inner dimension of the upper section of the leg.

30. The landing gear assembly of claim 24, wherein the subassembly includes a second bearing that is entirely located within an interior envelop of the leg.

31. A subassembly for use in manufacturing a landing gear leg, the subassembly comprising a bearing member adapted to be mounted on the leg, a shaft mounted on the bearing member for rotation, and gearing associated with the shaft for use in transmitting rotation, whereby the shaft and gearing are supported for rotation independently of mounting in the leg;
wherein the shaft constitutes a first idler shaft, the subassembly further comprising a second shaft mounted on the bearing member for rotation; and
wherein the second shaft constitutes a second idler shaft, the subassembly further comprising an input shaft and an output shaft mounted on the bearing member for rotation.

32. The subassembly of claim 31, wherein the subassembly is adapted to be mounted within an end of the leg.

33. The subassembly as set forth in claim 31, wherein the bearing member comprises a top cover, an outside cover plate attached to the top cover and an inside cover plate attached to the top cover.

* * * * *